United States Patent
Lien et al.

(10) Patent No.: US 10,705,185 B1
(45) Date of Patent: Jul. 7, 2020

(54) APPLICATION-BASED SIGNAL PROCESSING PARAMETERS IN RADAR-BASED DETECTION

(71) Applicant: Google Inc., Mountain View, CA (US)

(72) Inventors: Jaime Lien, Mountain View, CA (US); Erik M. Olson, Cupertino, CA (US)

(73) Assignee: Google LLC, Mountain View, CA (US)

( * ) Notice: Subject to any disclaimer, the term of this patent is extended or adjusted under 35 U.S.C. 154(b) by 439 days.

(21) Appl. No.: 15/287,394

(22) Filed: Oct. 6, 2016

Related U.S. Application Data

(60) Provisional application No. 62/237,975, filed on Oct. 6, 2015.

(51) Int. Cl.
*G01S 7/40* (2006.01)
*G01S 13/56* (2006.01)

(52) U.S. Cl.
CPC ............ *G01S 7/4004* (2013.01); *G01S 13/56* (2013.01)

(58) Field of Classification Search
CPC ............................... G01S 7/4004; G01S 13/56
USPC ......................................................... 342/174
See application file for complete search history.

(56) References Cited

U.S. PATENT DOCUMENTS

| | | |
|---|---|---|
| 3,610,874 A | 10/1971 | Gagliano |
| 3,752,017 A | 8/1973 | Lloyd et al. |
| 3,953,706 A | 4/1976 | Harris et al. |
| 4,104,012 A | 8/1978 | Ferrante |
| 4,654,967 A | 4/1987 | Thenner |
| 4,700,044 A | 10/1987 | Hokanson et al. |
| 4,795,998 A | 1/1989 | Dunbar et al. |

(Continued)

FOREIGN PATENT DOCUMENTS

| | | |
|---|---|---|
| CN | 1462382 | 12/2003 |
| CN | 101751126 | 6/2010 |

(Continued)

OTHER PUBLICATIONS

"Combined Search and Examination Report", GB Application No. 1620891.0, dated May 31, 2017, 9 pages.

(Continued)

*Primary Examiner* — Vladimir Magloire
*Assistant Examiner* — Nuzhat Pervin
(74) *Attorney, Agent, or Firm* — Colby Nipper PLLC

(57) ABSTRACT

Various embodiments utilize application-based processing parameters to dynamically configure a radar-based detection system based upon an operating context of an associated device. A first application with execution priority on a device dynamically configures the radar-based detection system to emit a radar field suitable for a first operating context associated with the first application. The first application can also dynamically configure processing parameters of the radar-based detection system, such as digital signal processing parameters and machine-learning parameters. In some cases, a second application assumes execution priority over the first application, and dynamically reconfigures the radar-based detection system to emit a radar field suitable to a second operating context associated with the second application. Alternately or additionally, the second application can dynamically reconfigure the processing parameters of the radar-based detection system based upon the second operating context of the second application.

20 Claims, 10 Drawing Sheets

(56) References Cited

U.S. PATENT DOCUMENTS

| | | | |
|---|---|---|---|
| 4,838,797 A | 6/1989 | Dodier | |
| 5,016,500 A | 5/1991 | Conrad et al. | |
| 5,121,124 A | 6/1992 | Spivey et al. | |
| 5,298,715 A | 3/1994 | Chalco et al. | |
| 5,341,979 A | 8/1994 | Gupta | |
| 5,410,471 A | 4/1995 | Alyfuku et al. | |
| 5,468,917 A | 11/1995 | Brodsky et al. | |
| 5,564,571 A | 10/1996 | Zanotti | |
| 5,656,798 A | 8/1997 | Kubo et al. | |
| 5,724,707 A | 3/1998 | Kirk et al. | |
| 5,798,798 A | 8/1998 | Rector et al. | |
| 6,032,450 A | 3/2000 | Blum | |
| 6,037,893 A | 3/2000 | Lipman | |
| 6,080,690 A | 6/2000 | Lebby et al. | |
| 6,101,431 A | 8/2000 | Niwa et al. | |
| 6,210,771 B1 | 4/2001 | Post et al. | |
| 6,254,544 B1 | 7/2001 | Hayashi | |
| 6,313,825 B1 | 11/2001 | Gilbert | |
| 6,340,979 B1 | 1/2002 | Beaton et al. | |
| 6,380,882 B1 * | 4/2002 | Hegnauer | G01S 13/348 340/554 |
| 6,386,757 B1 | 5/2002 | Konno | |
| 6,440,593 B2 | 8/2002 | Ellison et al. | |
| 6,492,980 B2 | 12/2002 | Sandbach | |
| 6,493,933 B1 | 12/2002 | Post et al. | |
| 6,513,833 B2 | 2/2003 | Breed et al. | |
| 6,513,970 B1 | 2/2003 | Tabata et al. | |
| 6,524,239 B1 | 2/2003 | Reed et al. | |
| 6,543,668 B1 | 4/2003 | Fujii et al. | |
| 6,616,613 B1 | 9/2003 | Goodman | |
| 6,711,354 B2 | 3/2004 | Kameyama | |
| 6,717,065 B2 | 4/2004 | Hosaka et al. | |
| 6,802,720 B2 | 10/2004 | Weiss et al. | |
| 6,833,807 B2 * | 12/2004 | Flacke | G01S 13/582 342/109 |
| 6,835,898 B2 | 12/2004 | Eldridge et al. | |
| 6,854,985 B1 | 2/2005 | Weiss | |
| 6,929,484 B2 | 8/2005 | Weiss et al. | |
| 6,970,128 B1 | 11/2005 | Dwelly et al. | |
| 6,997,882 B1 | 2/2006 | Parker et al. | |
| 7,019,682 B1 | 3/2006 | Louberg et al. | |
| 7,134,879 B2 | 11/2006 | Sugimoto et al. | |
| 7,158,076 B2 | 1/2007 | Fiore et al. | |
| 7,164,820 B2 | 1/2007 | Eves et al. | |
| 7,194,371 B1 | 3/2007 | McBride et al. | |
| 7,205,932 B2 | 4/2007 | Fiore | |
| 7,223,105 B2 | 5/2007 | Weiss et al. | |
| 7,230,610 B2 | 6/2007 | Jung et al. | |
| 7,249,954 B2 | 7/2007 | Weiss | |
| 7,266,532 B2 * | 9/2007 | Sutton | H04L 29/06 706/12 |
| 7,299,964 B2 | 11/2007 | Jayaraman et al. | |
| 7,310,236 B2 | 12/2007 | Takahashi et al. | |
| 7,317,416 B2 | 1/2008 | Flom et al. | |
| 7,348,285 B2 | 3/2008 | Dhawan et al. | |
| 7,365,031 B2 | 4/2008 | Swallow et al. | |
| 7,421,061 B2 | 9/2008 | Boese et al. | |
| 7,462,035 B2 | 12/2008 | Lee et al. | |
| 7,528,082 B2 | 5/2009 | Krans et al. | |
| 7,544,627 B2 | 6/2009 | Tao et al. | |
| 7,578,195 B2 | 8/2009 | DeAngelis et al. | |
| 7,644,488 B2 | 1/2010 | Aisenbrey | |
| 7,647,093 B2 | 1/2010 | Bojovic et al. | |
| 7,670,144 B2 | 3/2010 | Ito et al. | |
| 7,677,729 B2 | 3/2010 | Vilser et al. | |
| 7,691,067 B2 | 4/2010 | Westbrook et al. | |
| 7,698,154 B2 | 4/2010 | Marchosky | |
| 7,791,700 B2 | 9/2010 | Bellamy | |
| 7,834,276 B2 | 11/2010 | Chou et al. | |
| 7,845,023 B2 | 12/2010 | Swatee | |
| 7,941,676 B2 | 5/2011 | Glaser | |
| 7,952,512 B1 | 5/2011 | Delker et al. | |
| 7,999,722 B2 | 8/2011 | Beeri et al. | |
| 8,062,220 B2 | 11/2011 | Kurtz et al. | |
| 8,063,815 B2 | 11/2011 | Valo et al. | |
| 8,169,404 B1 | 5/2012 | Boillot | |
| 8,179,604 B1 | 5/2012 | Prada Gomez et al. | |
| 8,193,929 B1 | 6/2012 | Siu et al. | |
| 8,199,104 B2 | 6/2012 | Park et al. | |
| 8,282,232 B2 | 10/2012 | Hsu et al. | |
| 8,289,185 B2 | 10/2012 | Alonso | |
| 8,301,232 B2 | 10/2012 | Albert et al. | |
| 8,314,732 B2 * | 11/2012 | Oswald | G01S 7/2926 342/114 |
| 8,334,226 B2 | 12/2012 | Nhan et al. | |
| 8,341,762 B2 | 1/2013 | Balzano | |
| 8,344,949 B2 | 1/2013 | Moshfeghi | |
| 8,367,942 B2 | 2/2013 | Howell et al. | |
| 8,475,367 B1 | 7/2013 | Yuen et al. | |
| 8,505,474 B2 | 8/2013 | Kang et al. | |
| 8,509,882 B2 | 8/2013 | Albert et al. | |
| 8,514,221 B2 | 8/2013 | King et al. | |
| 8,527,146 B1 | 9/2013 | Jackson et al. | |
| 8,549,829 B2 | 10/2013 | Song et al. | |
| 8,560,972 B2 | 10/2013 | Wilson | |
| 8,562,526 B2 | 10/2013 | Heneghan et al. | |
| 8,569,189 B2 | 10/2013 | Bhattacharya et al. | |
| 8,614,689 B2 | 12/2013 | Nishikawa et al. | |
| 8,655,004 B2 | 2/2014 | Prest et al. | |
| 8,700,137 B2 | 4/2014 | Albert | |
| 8,758,020 B2 | 6/2014 | Burdea et al. | |
| 8,759,713 B2 | 6/2014 | Sheats | |
| 8,764,651 B2 | 7/2014 | Tran | |
| 8,785,778 B2 | 7/2014 | Streeter et al. | |
| 8,790,257 B2 | 7/2014 | Libbus et al. | |
| 8,814,574 B2 | 8/2014 | Selby et al. | |
| 8,819,812 B1 | 8/2014 | Weber et al. | |
| 8,854,433 B1 | 10/2014 | Rafii | |
| 8,860,602 B2 * | 10/2014 | Nohara | G01S 7/003 342/26 R |
| 8,921,473 B1 | 12/2014 | Hyman | |
| 8,948,839 B1 | 2/2015 | Longinotti-Buitoni et al. | |
| 9,055,879 B2 | 6/2015 | Selby et al. | |
| 9,075,429 B1 | 7/2015 | Karakotsios et al. | |
| 9,093,289 B2 | 7/2015 | Vicard et al. | |
| 9,125,456 B2 | 9/2015 | Chow | |
| 9,141,194 B1 | 9/2015 | Keyes et al. | |
| 9,148,949 B2 | 9/2015 | Guofu et al. | |
| 9,223,494 B1 | 12/2015 | DeSalvo et al. | |
| 9,229,102 B1 * | 1/2016 | Wright | G01S 13/888 |
| 9,230,160 B1 | 1/2016 | Kanter | |
| 9,235,241 B2 | 1/2016 | Newham et al. | |
| 9,316,727 B2 * | 4/2016 | Sentelle | G01S 13/32 |
| 9,331,422 B2 | 5/2016 | Nazzaro et al. | |
| 9,335,825 B2 | 5/2016 | Rautiainen et al. | |
| 9,346,167 B2 * | 5/2016 | O'Connor | G06N 3/008 |
| 9,354,709 B1 | 5/2016 | Heller et al. | |
| 9,508,141 B2 | 11/2016 | Khachaturian et al. | |
| 9,511,877 B2 | 12/2016 | Masson | |
| 9,569,001 B2 | 2/2017 | Mistry et al. | |
| 9,575,560 B2 | 2/2017 | Poupyrev et al. | |
| 9,588,625 B2 | 3/2017 | Poupyrev | |
| 9,594,443 B2 | 3/2017 | Vanblon et al. | |
| 9,600,080 B2 | 3/2017 | Poupyrev | |
| 9,693,592 B2 | 7/2017 | Robinson et al. | |
| 9,746,551 B2 * | 8/2017 | Scholten | A61B 5/0002 |
| 9,766,742 B2 | 9/2017 | Papakostas | |
| 9,778,749 B2 | 10/2017 | Poupyrev | |
| 9,811,164 B2 | 11/2017 | Poupyrev | |
| 9,817,109 B2 | 11/2017 | Saboo et al. | |
| 9,837,760 B2 | 12/2017 | Karagozler et al. | |
| 9,848,780 B1 | 12/2017 | DeBusschere et al. | |
| 9,921,660 B2 | 3/2018 | Poupyrev | |
| 9,933,908 B2 | 4/2018 | Poupyrev | |
| 9,947,080 B2 * | 4/2018 | Nguyen | G06T 3/60 |
| 9,971,414 B2 | 5/2018 | Gollakota et al. | |
| 9,971,415 B2 * | 5/2018 | Poupyrev | G06F 3/014 |
| 9,983,747 B2 | 5/2018 | Poupyrev | |
| 9,994,233 B2 | 6/2018 | Diaz-Jimenez et al. | |
| 10,016,162 B1 | 7/2018 | Rogers et al. | |
| 10,034,630 B2 | 7/2018 | Lee et al. | |
| 10,073,590 B2 * | 9/2018 | Dascola | G06F 3/0482 |
| 10,080,528 B2 | 9/2018 | DeBusschere et al. | |
| 10,082,950 B2 | 9/2018 | Lapp | |

(56) References Cited

U.S. PATENT DOCUMENTS

| | | |
|---|---|---|
| 10,088,908 B1 | 10/2018 | Poupyrev et al. |
| 10,139,916 B2 | 11/2018 | Poupyrev |
| 10,155,274 B2 | 12/2018 | Robinson et al. |
| 10,175,781 B2 | 1/2019 | Karagozler et al. |
| 10,203,763 B1 | 2/2019 | Poupyrev et al. |
| 10,222,469 B1 | 3/2019 | Gillian et al. |
| 10,241,581 B2 | 3/2019 | Lien et al. |
| 10,268,321 B2 | 4/2019 | Poupyrev |
| 10,285,456 B2 | 5/2019 | Poupyrev et al. |
| 10,300,370 B1 | 5/2019 | Amihood et al. |
| 10,310,620 B2 | 6/2019 | Lien et al. |
| 10,310,621 B1 | 6/2019 | Lien et al. |
| 10,379,621 B2 | 8/2019 | Schwesig et al. |
| 10,401,490 B2 | 9/2019 | Gillian et al. |
| 10,409,385 B2 | 9/2019 | Poupyrev |
| 10,459,080 B1 | 10/2019 | Schwesig et al. |
| 10,492,302 B2 | 11/2019 | Karagozler et al. |
| 10,579,150 B2 | 3/2020 | Gu et al. |
| 10,642,367 B2 | 5/2020 | Poupyrev |
| 2001/0035836 A1 | 11/2001 | Miceli et al. |
| 2002/0009972 A1 | 1/2002 | Amento et al. |
| 2002/0080156 A1 | 6/2002 | Abbott et al. |
| 2002/0170897 A1 | 11/2002 | Hall |
| 2003/0005030 A1* | 1/2003 | Sutton .................... H04L 29/06 709/200 |
| 2003/0071750 A1 | 4/2003 | Benitz |
| 2003/0093000 A1 | 5/2003 | Nishio et al. |
| 2003/0100228 A1 | 5/2003 | Bungo et al. |
| 2003/0119391 A1 | 6/2003 | Swallow et al. |
| 2003/0122677 A1 | 7/2003 | Kail |
| 2004/0009729 A1 | 1/2004 | Hill et al. |
| 2004/0102693 A1 | 5/2004 | Jenkins |
| 2004/0249250 A1 | 12/2004 | McGee et al. |
| 2004/0259391 A1 | 12/2004 | Jung et al. |
| 2005/0069695 A1 | 3/2005 | Jung et al. |
| 2005/0128124 A1 | 6/2005 | Greneker et al. |
| 2005/0148876 A1 | 7/2005 | Endoh et al. |
| 2005/0231419 A1 | 10/2005 | Mitchell |
| 2005/0267366 A1 | 12/2005 | Murashita et al. |
| 2006/0035554 A1 | 2/2006 | Glaser et al. |
| 2006/0040739 A1 | 2/2006 | Wells |
| 2006/0047386 A1 | 3/2006 | Kanevsky et al. |
| 2006/0061504 A1 | 3/2006 | Leach, Jr. et al. |
| 2006/0125803 A1 | 6/2006 | Westerman et al. |
| 2006/0136997 A1 | 6/2006 | Telek et al. |
| 2006/0139162 A1 | 6/2006 | Flynn |
| 2006/0139314 A1 | 6/2006 | Bell |
| 2006/0148351 A1 | 7/2006 | Tao et al. |
| 2006/0157734 A1 | 7/2006 | Onodero et al. |
| 2006/0166620 A1 | 7/2006 | Sorensen |
| 2006/0170584 A1 | 8/2006 | Romero et al. |
| 2006/0209021 A1 | 9/2006 | Yoo et al. |
| 2006/0258205 A1 | 11/2006 | Locher et al. |
| 2006/0284757 A1 | 12/2006 | Zemany |
| 2007/0024488 A1 | 2/2007 | Zemany et al. |
| 2007/0026695 A1 | 2/2007 | Lee et al. |
| 2007/0027369 A1 | 2/2007 | Pagnacco et al. |
| 2007/0118043 A1 | 5/2007 | Oliver et al. |
| 2007/0161921 A1 | 7/2007 | Rausch |
| 2007/0164896 A1 | 7/2007 | Suzuki et al. |
| 2007/0176821 A1 | 8/2007 | Flom et al. |
| 2007/0192647 A1 | 8/2007 | Glaser |
| 2007/0197115 A1 | 8/2007 | Eves et al. |
| 2007/0197878 A1 | 8/2007 | Shklarski |
| 2007/0210074 A1 | 9/2007 | Maurer et al. |
| 2007/0237423 A1 | 10/2007 | Tico et al. |
| 2008/0001735 A1 | 1/2008 | Tran |
| 2008/0002027 A1 | 1/2008 | Kondo et al. |
| 2008/0015422 A1 | 1/2008 | Wessel |
| 2008/0024438 A1 | 1/2008 | Collins et al. |
| 2008/0039731 A1 | 2/2008 | McCombie et al. |
| 2008/0059578 A1 | 3/2008 | Albertson et al. |
| 2008/0065291 A1 | 3/2008 | Breed |
| 2008/0074307 A1* | 3/2008 | Boric-Lubecke .... A61B 5/0205 342/28 |
| 2008/0134102 A1 | 6/2008 | Movold et al. |
| 2008/0136775 A1 | 6/2008 | Conant |
| 2008/0168396 A1 | 7/2008 | Matas et al. |
| 2008/0194204 A1 | 8/2008 | Duet et al. |
| 2008/0194975 A1 | 8/2008 | MacQuarrie et al. |
| 2008/0211766 A1 | 9/2008 | Westerman et al. |
| 2008/0233822 A1 | 9/2008 | Swallow et al. |
| 2008/0278450 A1 | 11/2008 | Lashina |
| 2008/0282665 A1 | 11/2008 | Speleers |
| 2008/0291158 A1 | 11/2008 | Park et al. |
| 2008/0303800 A1 | 12/2008 | Elwell |
| 2008/0316085 A1 | 12/2008 | Rofougaran et al. |
| 2008/0320419 A1 | 12/2008 | Matas et al. |
| 2009/0018408 A1 | 1/2009 | Ouchi et al. |
| 2009/0018428 A1 | 1/2009 | Dias et al. |
| 2009/0033585 A1 | 2/2009 | Lang |
| 2009/0053950 A1 | 2/2009 | Surve |
| 2009/0056300 A1 | 3/2009 | Chung et al. |
| 2009/0058820 A1 | 3/2009 | Hinckley |
| 2009/0113298 A1 | 4/2009 | Jung et al. |
| 2009/0115617 A1 | 5/2009 | Sano et al. |
| 2009/0118648 A1 | 5/2009 | Kandori et al. |
| 2009/0149036 A1 | 6/2009 | Lee et al. |
| 2009/0177068 A1 | 7/2009 | Stivoric et al. |
| 2009/0203244 A1 | 8/2009 | Toonder |
| 2009/0226043 A1* | 9/2009 | Angell ............... G06K 9/00771 382/115 |
| 2009/0253585 A1 | 10/2009 | Diatchenko et al. |
| 2009/0270690 A1 | 10/2009 | Roos et al. |
| 2009/0278915 A1 | 11/2009 | Kramer et al. |
| 2009/0288762 A1 | 11/2009 | Wolfel |
| 2009/0295712 A1 | 12/2009 | Ritzau |
| 2009/0319181 A1 | 12/2009 | Khosravy et al. |
| 2010/0002912 A1 | 1/2010 | Solinsky |
| 2010/0045513 A1 | 2/2010 | Pett et al. |
| 2010/0050133 A1 | 2/2010 | Nishihara et al. |
| 2010/0053151 A1 | 3/2010 | Marti et al. |
| 2010/0060570 A1 | 3/2010 | Underkoffler et al. |
| 2010/0065320 A1 | 3/2010 | Urano |
| 2010/0069730 A1 | 3/2010 | Bergstrom et al. |
| 2010/0071205 A1 | 3/2010 | Graumann et al. |
| 2010/0094141 A1 | 4/2010 | Puswella |
| 2010/0109938 A1* | 5/2010 | Oswald ................. G01S 7/2926 342/90 |
| 2010/0152600 A1* | 6/2010 | Droitcour ................ A61B 5/05 600/534 |
| 2010/0179820 A1 | 7/2010 | Harrison et al. |
| 2010/0198067 A1 | 8/2010 | Mahfouz et al. |
| 2010/0201586 A1 | 8/2010 | Michalk |
| 2010/0204550 A1 | 8/2010 | Heneghan et al. |
| 2010/0205667 A1 | 8/2010 | Anderson et al. |
| 2010/0208035 A1 | 8/2010 | Pinault et al. |
| 2010/0225562 A1 | 9/2010 | Smith |
| 2010/0234094 A1 | 9/2010 | Gagner et al. |
| 2010/0241009 A1 | 9/2010 | Petkie |
| 2010/0281438 A1 | 11/2010 | Latta et al. |
| 2010/0292549 A1 | 11/2010 | Shuler |
| 2010/0306713 A1 | 12/2010 | Geisner et al. |
| 2010/0313414 A1 | 12/2010 | Sheats |
| 2010/0324384 A1 | 12/2010 | Moon et al. |
| 2010/0325770 A1 | 12/2010 | Chung et al. |
| 2011/0003664 A1 | 1/2011 | Richard |
| 2011/0010014 A1 | 1/2011 | Oexman et al. |
| 2011/0018795 A1 | 1/2011 | Jang |
| 2011/0029038 A1 | 2/2011 | Hyde et al. |
| 2011/0073353 A1 | 3/2011 | Lee et al. |
| 2011/0083111 A1* | 4/2011 | Forutanpour ........... H04W 4/21 715/863 |
| 2011/0093820 A1 | 4/2011 | Zhang et al. |
| 2011/0118564 A1 | 5/2011 | Sankai |
| 2011/0119640 A1 | 5/2011 | Berkes et al. |
| 2011/0166940 A1 | 7/2011 | Bangera et al. |
| 2011/0181509 A1 | 7/2011 | Rautiainen et al. |
| 2011/0181510 A1 | 7/2011 | Hakala et al. |
| 2011/0193939 A1 | 8/2011 | Vassigh et al. |
| 2011/0197263 A1 | 8/2011 | Stinson, III |
| 2011/0202404 A1 | 8/2011 | van der Riet |
| 2011/0213218 A1 | 9/2011 | Weiner et al. |
| 2011/0221666 A1 | 9/2011 | Newton et al. |

(56) References Cited

U.S. PATENT DOCUMENTS

| | | |
|---|---|---|
| 2011/0234492 A1 | 9/2011 | Ajmera et al. |
| 2011/0239118 A1 | 9/2011 | Yamaoka et al. |
| 2011/0245688 A1 | 10/2011 | Arora et al. |
| 2011/0279303 A1 | 11/2011 | Smith |
| 2011/0286585 A1 | 11/2011 | Hodge |
| 2011/0303341 A1 | 12/2011 | Meiss et al. |
| 2011/0307842 A1 | 12/2011 | Chiang et al. |
| 2011/0316888 A1* | 12/2011 | Sachs .................. G06F 1/1626 345/667 |
| 2011/0318985 A1 | 12/2011 | McDermid |
| 2012/0001875 A1 | 1/2012 | Li et al. |
| 2012/0013571 A1 | 1/2012 | Yeh et al. |
| 2012/0019168 A1 | 1/2012 | Noda et al. |
| 2012/0029369 A1 | 2/2012 | Icove et al. |
| 2012/0047468 A1 | 2/2012 | Santos et al. |
| 2012/0068876 A1 | 3/2012 | Bangera et al. |
| 2012/0092284 A1 | 4/2012 | Rofougaran et al. |
| 2012/0123232 A1 | 5/2012 | Najarian et al. |
| 2012/0127082 A1 | 5/2012 | Kushler et al. |
| 2012/0144934 A1 | 6/2012 | Russell et al. |
| 2012/0150493 A1* | 6/2012 | Casey ................. H03M 7/3062 702/188 |
| 2012/0154313 A1 | 6/2012 | Au et al. |
| 2012/0156926 A1 | 6/2012 | Kato et al. |
| 2012/0174299 A1 | 7/2012 | Balzano |
| 2012/0174736 A1 | 7/2012 | Wang et al. |
| 2012/0182222 A1 | 7/2012 | Moloney |
| 2012/0193801 A1 | 8/2012 | Gross et al. |
| 2012/0220835 A1 | 8/2012 | Chung |
| 2012/0248093 A1 | 10/2012 | Ulrich et al. |
| 2012/0254810 A1 | 10/2012 | Heck et al. |
| 2012/0268416 A1 | 10/2012 | Pirogov et al. |
| 2012/0270564 A1 | 10/2012 | Gum et al. |
| 2012/0280900 A1 | 11/2012 | Wang et al. |
| 2012/0298748 A1 | 11/2012 | Factor et al. |
| 2012/0310665 A1 | 12/2012 | Xu et al. |
| 2013/0016070 A1 | 1/2013 | Starner et al. |
| 2013/0027218 A1 | 1/2013 | Schwarz et al. |
| 2013/0035563 A1 | 2/2013 | Angellides |
| 2013/0046544 A1 | 2/2013 | Kay et al. |
| 2013/0053653 A1 | 2/2013 | Cuddihy et al. |
| 2013/0078624 A1 | 3/2013 | Holmes et al. |
| 2013/0082922 A1 | 4/2013 | Miller |
| 2013/0083173 A1* | 4/2013 | Geisner ................. G06F 3/013 348/51 |
| 2013/0086533 A1 | 4/2013 | Stienstra |
| 2013/0096439 A1 | 4/2013 | Lee et al. |
| 2013/0102217 A1 | 4/2013 | Jeon |
| 2013/0104084 A1 | 4/2013 | Mlyniec et al. |
| 2013/0113647 A1* | 5/2013 | Sentelle ................. G01S 13/32 342/22 |
| 2013/0113830 A1 | 5/2013 | Suzuki |
| 2013/0117377 A1 | 5/2013 | Miller |
| 2013/0132931 A1 | 5/2013 | Bruns et al. |
| 2013/0147833 A1 | 6/2013 | Aubauer et al. |
| 2013/0150735 A1 | 6/2013 | Cheng |
| 2013/0161078 A1 | 6/2013 | Li |
| 2013/0169471 A1 | 7/2013 | Lynch |
| 2013/0176161 A1 | 7/2013 | Derham et al. |
| 2013/0194173 A1 | 8/2013 | Zhu et al. |
| 2013/0195330 A1 | 8/2013 | Kim et al. |
| 2013/0196716 A1 | 8/2013 | Muhammad |
| 2013/0207962 A1 | 8/2013 | Oberdorfer et al. |
| 2013/0229508 A1 | 9/2013 | Li et al. |
| 2013/0241765 A1* | 9/2013 | Kozma ................. G01S 13/522 342/107 |
| 2013/0245986 A1* | 9/2013 | Grokop ................. H04W 4/027 702/141 |
| 2013/0253029 A1 | 9/2013 | Jain et al. |
| 2013/0260630 A1 | 10/2013 | Ito et al. |
| 2013/0278499 A1 | 10/2013 | Anderson |
| 2013/0278501 A1 | 10/2013 | Bulzacki |
| 2013/0281024 A1 | 10/2013 | Rofougaran et al. |
| 2013/0283203 A1 | 10/2013 | Batraski et al. |
| 2013/0322729 A1 | 12/2013 | Mestha et al. |
| 2013/0332438 A1 | 12/2013 | Li et al. |
| 2013/0345569 A1 | 12/2013 | Mestha et al. |
| 2014/0005809 A1 | 1/2014 | Frei et al. |
| 2014/0022108 A1* | 1/2014 | Alberth, Jr. ............ G01S 13/931 342/52 |
| 2014/0028539 A1 | 1/2014 | Newham et al. |
| 2014/0049487 A1* | 2/2014 | Konertz .................. G06F 3/041 345/173 |
| 2014/0050354 A1 | 2/2014 | Heim et al. |
| 2014/0051941 A1 | 2/2014 | Messerschmidt |
| 2014/0070957 A1 | 3/2014 | Longinotti-Buitoni et al. |
| 2014/0072190 A1 | 3/2014 | Wu et al. |
| 2014/0073486 A1 | 3/2014 | Ahmed et al. |
| 2014/0073969 A1 | 3/2014 | Zou et al. |
| 2014/0081100 A1 | 3/2014 | Muhsin et al. |
| 2014/0095480 A1 | 4/2014 | Marantz et al. |
| 2014/0097979 A1* | 4/2014 | Nohara .................. G01S 7/003 342/90 |
| 2014/0121540 A1 | 5/2014 | Raskin |
| 2014/0135631 A1 | 5/2014 | Brumback et al. |
| 2014/0139422 A1* | 5/2014 | Mistry .................. G04G 17/04 345/156 |
| 2014/0139616 A1 | 5/2014 | Pinter et al. |
| 2014/0143678 A1* | 5/2014 | Mistry .................. G06F 3/0488 715/746 |
| 2014/0149859 A1 | 5/2014 | Van Dyken et al. |
| 2014/0184496 A1 | 7/2014 | Gribetz et al. |
| 2014/0184499 A1 | 7/2014 | Kim |
| 2014/0191939 A1 | 7/2014 | Penn et al. |
| 2014/0200416 A1 | 7/2014 | Kashef et al. |
| 2014/0201690 A1 | 7/2014 | Holz |
| 2014/0208275 A1 | 7/2014 | Mongia et al. |
| 2014/0215389 A1 | 7/2014 | Walsh et al. |
| 2014/0239065 A1 | 8/2014 | Zhou et al. |
| 2014/0244277 A1 | 8/2014 | Krishna Rao et al. |
| 2014/0246415 A1 | 9/2014 | Wittkowski |
| 2014/0247212 A1 | 9/2014 | Kim et al. |
| 2014/0250515 A1 | 9/2014 | Jakobsson |
| 2014/0253431 A1 | 9/2014 | Gossweiler et al. |
| 2014/0253709 A1 | 9/2014 | Bresch et al. |
| 2014/0262478 A1 | 9/2014 | Harris et al. |
| 2014/0275854 A1 | 9/2014 | Venkatraman et al. |
| 2014/0280295 A1 | 9/2014 | Kurochikin et al. |
| 2014/0281975 A1 | 9/2014 | Anderson |
| 2014/0282877 A1 | 9/2014 | Mahaffey et al. |
| 2014/0297006 A1 | 10/2014 | Sadhu |
| 2014/0298266 A1 | 10/2014 | Lapp |
| 2014/0300506 A1 | 10/2014 | Alton et al. |
| 2014/0306936 A1 | 10/2014 | Dahl et al. |
| 2014/0309855 A1 | 10/2014 | Tran |
| 2014/0316261 A1 | 10/2014 | Lux et al. |
| 2014/0318699 A1 | 10/2014 | Longinotti-Buitoni et al. |
| 2014/0324888 A1 | 10/2014 | Xie et al. |
| 2014/0329567 A1 | 11/2014 | Chan et al. |
| 2014/0333467 A1 | 11/2014 | Inomata |
| 2014/0343392 A1 | 11/2014 | Yang |
| 2014/0347295 A1 | 11/2014 | Kim et al. |
| 2014/0357369 A1 | 12/2014 | Callens et al. |
| 2014/0368378 A1 | 12/2014 | Crain et al. |
| 2014/0368441 A1 | 12/2014 | Touloumtzis |
| 2014/0376788 A1 | 12/2014 | Xu et al. |
| 2015/0002391 A1 | 1/2015 | Chen |
| 2015/0009096 A1 | 1/2015 | Lee et al. |
| 2015/0026815 A1 | 1/2015 | Barrett |
| 2015/0029050 A1 | 1/2015 | Driscoll et al. |
| 2015/0030256 A1 | 1/2015 | Brady et al. |
| 2015/0040040 A1 | 2/2015 | Balan et al. |
| 2015/0046183 A1 | 2/2015 | Cireddu |
| 2015/0062033 A1 | 3/2015 | Ishihara |
| 2015/0068069 A1 | 3/2015 | Tran et al. |
| 2015/0077282 A1 | 3/2015 | Mohamadi |
| 2015/0085060 A1 | 3/2015 | Fish et al. |
| 2015/0091820 A1 | 4/2015 | Rosenberg et al. |
| 2015/0091858 A1 | 4/2015 | Rosenberg et al. |
| 2015/0091859 A1 | 4/2015 | Rosenberg et al. |
| 2015/0091903 A1 | 4/2015 | Costello et al. |
| 2015/0095987 A1 | 4/2015 | Potash et al. |
| 2015/0099941 A1 | 4/2015 | Tran |

(56) References Cited

U.S. PATENT DOCUMENTS

| | | |
|---|---|---|
| 2015/0100328 A1 | 4/2015 | Kress et al. |
| 2015/0106770 A1 | 4/2015 | Shah et al. |
| 2015/0109164 A1 | 4/2015 | Takaki |
| 2015/0112606 A1 | 4/2015 | He et al. |
| 2015/0133017 A1 | 5/2015 | Liao et al. |
| 2015/0143601 A1 | 5/2015 | Longinotti-Buitoni et al. |
| 2015/0145805 A1 | 5/2015 | Liu |
| 2015/0162729 A1 | 6/2015 | Reversat et al. |
| 2015/0177866 A1 | 6/2015 | Hwang et al. |
| 2015/0185314 A1 | 7/2015 | Corcos et al. |
| 2015/0199045 A1 | 7/2015 | Robucci et al. |
| 2015/0205358 A1 | 7/2015 | Lyren |
| 2015/0223733 A1 | 8/2015 | Al-Alusi |
| 2015/0226004 A1 | 8/2015 | Thompson |
| 2015/0229885 A1 | 8/2015 | Offenhaeuser |
| 2015/0256763 A1 | 9/2015 | Niemi |
| 2015/0261320 A1 | 9/2015 | Leto |
| 2015/0268027 A1 | 9/2015 | Gerdes |
| 2015/0268799 A1 | 9/2015 | Starner et al. |
| 2015/0277569 A1 * | 10/2015 | Sprenger ............... G06F 3/017 345/156 |
| 2015/0280102 A1 | 10/2015 | Tajitsu et al. |
| 2015/0285906 A1 | 10/2015 | Hooper et al. |
| 2015/0287187 A1 | 10/2015 | Redtel |
| 2015/0301167 A1 | 10/2015 | Sentelle et al. |
| 2015/0312041 A1 | 10/2015 | Choi |
| 2015/0314780 A1 | 11/2015 | Stenneth et al. |
| 2015/0317518 A1 | 11/2015 | Fujimaki et al. |
| 2015/0323993 A1 | 11/2015 | Levesque et al. |
| 2015/0332075 A1 | 11/2015 | Burch |
| 2015/0341550 A1 | 11/2015 | Lay |
| 2015/0346820 A1 | 12/2015 | Poupyrev et al. |
| 2015/0350902 A1 | 12/2015 | Baxley et al. |
| 2015/0351703 A1 | 12/2015 | Phillips et al. |
| 2015/0375339 A1 | 12/2015 | Sterling et al. |
| 2016/0018948 A1 | 1/2016 | Parvarandeh et al. |
| 2016/0026253 A1 * | 1/2016 | Bradski ............... G02B 27/0172 345/8 |
| 2016/0038083 A1 | 2/2016 | Ding et al. |
| 2016/0041617 A1 | 2/2016 | Poupyrev |
| 2016/0041618 A1 | 2/2016 | Poupyrev |
| 2016/0042169 A1 | 2/2016 | Polehn |
| 2016/0048235 A1 | 2/2016 | Poupyrev |
| 2016/0048236 A1 | 2/2016 | Poupyrev |
| 2016/0048672 A1 | 2/2016 | Lux et al. |
| 2016/0054792 A1 | 2/2016 | Poupyrev |
| 2016/0054803 A1 | 2/2016 | Poupyrev |
| 2016/0054804 A1 | 2/2016 | Gollakata et al. |
| 2016/0055201 A1 | 2/2016 | Poupyrev et al. |
| 2016/0090839 A1 | 3/2016 | Stolarcyzk |
| 2016/0098089 A1 | 4/2016 | Poupyrev |
| 2016/0100166 A1 | 4/2016 | Dragne et al. |
| 2016/0103500 A1 | 4/2016 | Hussey et al. |
| 2016/0106328 A1 | 4/2016 | Mestha et al. |
| 2016/0131741 A1 | 5/2016 | Park |
| 2016/0140872 A1 | 5/2016 | Palmer et al. |
| 2016/0145776 A1 | 5/2016 | Roh |
| 2016/0146931 A1 | 5/2016 | Rao et al. |
| 2016/0170491 A1 | 6/2016 | Jung |
| 2016/0171293 A1 | 6/2016 | Li et al. |
| 2016/0186366 A1 | 6/2016 | McMaster |
| 2016/0206244 A1 | 7/2016 | Rogers |
| 2016/0213331 A1 | 7/2016 | Gil et al. |
| 2016/0216825 A1 | 7/2016 | Forutanpour |
| 2016/0220152 A1 | 8/2016 | Meriheina et al. |
| 2016/0249698 A1 | 9/2016 | Berzowska et al. |
| 2016/0252607 A1 | 9/2016 | Saboo et al. |
| 2016/0252965 A1 | 9/2016 | Mandella et al. |
| 2016/0253044 A1 | 9/2016 | Katz |
| 2016/0259037 A1 | 9/2016 | Molchanov et al. |
| 2016/0262685 A1 | 9/2016 | Wagner et al. |
| 2016/0282988 A1 | 9/2016 | Poupyrev |
| 2016/0283101 A1 | 9/2016 | Schwesig et al. |
| 2016/0284436 A1 | 9/2016 | Fukuhara et al. |
| 2016/0287172 A1 | 10/2016 | Morris et al. |
| 2016/0299526 A1 | 10/2016 | Inagaki et al. |
| 2016/0320852 A1 | 11/2016 | Poupyrev |
| 2016/0320853 A1 | 11/2016 | Lien et al. |
| 2016/0320854 A1 | 11/2016 | Lien et al. |
| 2016/0321428 A1 | 11/2016 | Rogers |
| 2016/0338599 A1 | 11/2016 | DeBusschere et al. |
| 2016/0345638 A1 | 12/2016 | Robinson et al. |
| 2016/0349790 A1 | 12/2016 | Connor |
| 2016/0349845 A1 | 12/2016 | Poupyrev et al. |
| 2016/0377712 A1 | 12/2016 | Wu et al. |
| 2017/0029985 A1 | 2/2017 | Tajitsu et al. |
| 2017/0052618 A1 | 2/2017 | Lee et al. |
| 2017/0060254 A1 | 3/2017 | Molchanov et al. |
| 2017/0060298 A1 | 3/2017 | Hwang et al. |
| 2017/0075481 A1 | 3/2017 | Chou et al. |
| 2017/0075496 A1 | 3/2017 | Rosenberg et al. |
| 2017/0097413 A1 | 4/2017 | Gillian et al. |
| 2017/0097684 A1 | 4/2017 | Lien |
| 2017/0115777 A1 | 4/2017 | Poupyrev |
| 2017/0124407 A1 | 5/2017 | Micks et al. |
| 2017/0125940 A1 | 5/2017 | Karagozler et al. |
| 2017/0168630 A1 | 6/2017 | Khoshkava et al. |
| 2017/0192523 A1 | 7/2017 | Poupyrev |
| 2017/0192629 A1 | 7/2017 | Takada et al. |
| 2017/0196513 A1 | 7/2017 | Longinotti-Buitoni et al. |
| 2017/0231089 A1 | 8/2017 | Van Keymeulen |
| 2017/0232538 A1 | 8/2017 | Robinson et al. |
| 2017/0233903 A1 | 8/2017 | Jeon |
| 2017/0249033 A1 | 8/2017 | Podhajny et al. |
| 2017/0322633 A1 | 11/2017 | Shen et al. |
| 2017/0325337 A1 | 11/2017 | Karagozler et al. |
| 2017/0325518 A1 | 11/2017 | Poupyrev et al. |
| 2017/0329412 A1 | 11/2017 | Schwesig et al. |
| 2017/0329425 A1 | 11/2017 | Karagozler et al. |
| 2018/0000354 A1 | 1/2018 | DeBusschere et al. |
| 2018/0000355 A1 | 1/2018 | DeBusschere et al. |
| 2018/0004301 A1 | 1/2018 | Poupyrev |
| 2018/0005766 A1 | 1/2018 | Fairbanks et al. |
| 2018/0046258 A1 | 2/2018 | Poupyrev |
| 2018/0095541 A1 | 4/2018 | Gribetz et al. |
| 2018/0106897 A1 | 4/2018 | Shouldice et al. |
| 2018/0113032 A1 | 4/2018 | Dickey et al. |
| 2018/0157330 A1 | 6/2018 | Gu et al. |
| 2018/0160943 A1 | 6/2018 | Fyfe et al. |
| 2018/0177464 A1 | 6/2018 | DeBusschere et al. |
| 2018/0196527 A1 | 7/2018 | Poupyrev et al. |
| 2018/0256106 A1 | 9/2018 | Rogers et al. |
| 2018/0296163 A1 | 10/2018 | DeBusschere et al. |
| 2018/0321841 A1 | 11/2018 | Lapp |
| 2019/0033981 A1 | 1/2019 | Poupyrev |
| 2019/0138109 A1 | 5/2019 | Poupyrev et al. |
| 2019/0155396 A1 | 5/2019 | Lien et al. |
| 2019/0208837 A1 | 7/2019 | Poupyrev et al. |
| 2019/0232156 A1 | 8/2019 | Amihood et al. |
| 2019/0243464 A1 | 8/2019 | Lien et al. |
| 2019/0257939 A1 | 8/2019 | Schwesig et al. |
| 2019/0278379 A1 | 9/2019 | Gribetz et al. |
| 2019/0321719 A1 | 10/2019 | Gillian et al. |
| 2020/0089314 A1 | 3/2020 | Poupyrev et al. |

FOREIGN PATENT DOCUMENTS

| | | |
|---|---|---|
| CN | 102031615 | 4/2011 |
| CN | 102160471 | 8/2011 |
| CN | 102414641 | 4/2012 |
| CN | 102782612 | 11/2012 |
| CN | 102893327 | 1/2013 |
| CN | 202887794 | 4/2013 |
| CN | 103076911 | 5/2013 |
| CN | 103502911 | 1/2014 |
| CN | 102660988 | 3/2014 |
| CN | 103907405 | 7/2014 |
| CN | 104035552 | 9/2014 |
| CN | 103355860 | 1/2016 |
| DE | 102011075725 | 11/2012 |
| DE | 102013201359 | 7/2014 |
| EP | 0161895 | 11/1985 |
| EP | 1785744 | 5/2007 |
| EP | 1815788 | 8/2007 |

(56) References Cited

FOREIGN PATENT DOCUMENTS

| | | |  | |
|---|---|---|---|---|
| EP | 2417908 | 2/2012 | | |
| EP | 2637081 | 9/2013 | | |
| EP | 2770408 | 8/2014 | | |
| EP | 2953007 | 12/2015 | | |
| EP | 3201726 | 8/2017 | | |
| FR | 3017722 | 8/2015 | | |
| GB | 2070469 | 9/1981 | | |
| GB | 2443208 | 4/2008 | | |
| JP | 113860 | 4/1999 | | |
| JP | 11168268 | 6/1999 | | |
| JP | 2003280049 | 10/2003 | | |
| JP | 2006234716 | 9/2006 | | |
| JP | 2007011873 | 1/2007 | | |
| JP | 2007132768 | 5/2007 | | |
| JP | 2008287714 | 11/2008 | | |
| JP | 2009037434 | 2/2009 | | |
| JP | 2011102457 | 5/2011 | | |
| JP | 201218583. | 9/2012 | | |
| JP | 2012198916 | 10/2012 | | |
| JP | 2013196047 | 9/2013 | | |
| JP | 2014532332 | 12/2014 | | |
| KR | 1020080102516 | 11/2008 | | |
| KR | 100987650 | 10/2010 | | |
| KR | 102014005598 | 5/2014 | | |
| KR | 101914850 | 10/2018 | | |
| TW | 201425974 | 7/2014 | | |
| WO | WO-9001895 | 3/1990 | | |
| WO | WO-0130123 | 4/2001 | | |
| WO | WO-2001027855 | 4/2001 | | |
| WO | WO-0175778 | 10/2001 | | |
| WO | WO-2002082999 | 10/2002 | | |
| WO | WO-2004004557 | 1/2004 | | |
| WO | WO-2004053601 | A2 * | 6/2004 | ............ H04L 29/06 |
| WO | WO-2005033387 | 4/2005 | | |
| WO | 2007125298 | 11/2007 | | |
| WO | WO-2008061385 | 5/2008 | | |
| WO | WO-2009032073 | 3/2009 | | |
| WO | 2009083467 | 7/2009 | | |
| WO | WO-2010032173 | 3/2010 | | |
| WO | WO-2010101697 | 9/2010 | | |
| WO | WO-2012026013 | 3/2012 | | |
| WO | WO-2012064847 | 5/2012 | | |
| WO | WO-2012152476 | 11/2012 | | |
| WO | WO-2013082806 | 6/2013 | | |
| WO | WO-2013084108 | 6/2013 | | |
| WO | WO-2013186696 | 12/2013 | | |
| WO | WO-2013191657 | 12/2013 | | |
| WO | WO-2013192166 | 12/2013 | | |
| WO | WO-2014019085 | 2/2014 | | |
| WO | WO-2014085369 | 6/2014 | | |
| WO | WO-2014116968 | 7/2014 | | |
| WO | WO-2014124520 | 8/2014 | | |
| WO | WO-2014136027 | 9/2014 | | |
| WO | WO-2014138280 | 9/2014 | | |
| WO | WO-2014160893 | 10/2014 | | |
| WO | WO-2014165476 | 10/2014 | | |
| WO | WO-2014204323 | 12/2014 | | |
| WO | WO-2015017931 | 2/2015 | | |
| WO | WO-2015022671 | 2/2015 | | |
| WO | WO-2015149049 | A1 * | 10/2015 | ............ G06F 3/017 |
| WO | 2016053624 | 4/2016 | | |
| WO | WO-2016118534 | 7/2016 | | |
| WO | WO-2016176471 | 11/2016 | | |
| WO | WO-2016178797 | 11/2016 | | |
| WO | WO-2017019299 | 2/2017 | | |
| WO | 2017062566 | 4/2017 | | |
| WO | 2017200570 | 11/2017 | | |
| WO | 20170200949 | 11/2017 | | |
| WO | WO-2017200571 | 11/2017 | | |
| WO | 2018106306 | 6/2018 | | |

OTHER PUBLICATIONS

"Final Office Action", U.S. Appl. No. 15/398,147, dated Jun. 30, 2017, 11 pages.

"Final Office Action", U.S. Appl. No. 14/874,955, dated Jun. 30, 2017, 9 pages.

"Final Office Action", U.S. Appl. No. 14/959,799, dated Jul. 19, 2017, 12 pages.

"Final Office Action", U.S. Appl. No. 14/504,121, dated Aug. 8, 2017, 16 pages.

"International Search Report and Written Opinion", Application No. PCT/US2016/063874, dated May 11, 2017, 19 pages.

"Non-Final Office Action", U.S. Appl. No. 14/862,409, dated Jun. 22, 2017, 15 pages.

"Non-Final Office Action", U.S. Appl. No. 14/959,730, dated Jun. 23, 2017, 14 pages.

"Notice of Allowance", U.S. Appl. No. 14/513,875, dated Jun. 28, 2017, 7 pages.

"Notice of Allowance", U.S. Appl. No. 15/343,067, dated Jul. 27, 2017, 9 pages.

"Notice of Allowance", U.S. Appl. No. 14/504,038, dated Aug. 7, 2017, 17 pages.

"Notice of Allowance", U.S. Appl. No. 14/494,863, dated May 30, 2017, 7 pages.

"Cardiio", Retrieved From: <http://www.cardiio.com/> Apr. 15, 2015 App Information Retrieved From: <https://itunes.apple.com/us/app/cardiio-touchless-camera-pulse/id542891434?ls=1&mt=8> Apr. 15, 2015, Feb. 24, 2015, 6 pages.

"Extended European Search Report", EP Application No. 15170577.9, dated Nov. 5, 2015, 12 pages.

"Final Office Action", U.S. Appl. No. 14/312,486, dated Jun. 3, 2016, 32 pages.

"Final Office Action", U.S. Appl. No. 14/504,038, dated Sep. 27, 2016, 23 pages.

"Final Office Action", U.S. Appl. No. 14/504,061, dated Mar. 9, 2016, 10 pages.

"Frogpad Introduces Wearable Fabric Keyboard with Bluetooth Technology", Retrieved From: <http://www.geekzone.co.nz/content.asp?contentid=3898> Mar. 16, 2015, Jan. 7, 2005, 2 pages.

"International Search Report and Written Opinion", Application No. PCT/US2015/044774, dated Nov. 3, 2015, 12 pages.

"International Search Report and Written Opinion", Application No. PCT/US2016/024267, dated Jun. 20, 2016, 13 pages.

"International Search Report and Written Opinion", Application No. PCT/US2016/024273, dated Jun. 20, 2016, 13 pages.

"International Search Report and Written Opinion", Application No. PCT/US2016/032307, dated Aug. 25, 2016, 13 pages.

"International Search Report and Written Opinion", Application No. PCT/US2016/029820, dated Jul. 15, 2016, 14 pages.

"International Search Report and Written Opinion", Application No. PCT/US2016/030177, dated Aug. 2, 2016, 15 pages.

"International Search Report and Written Opinion", Application No. PCT/US2015/043963, dated Nov. 24, 2015, 16 pages.

"International Search Report and Written Opinion", Application No. PCT/US2015/050903, dated Feb. 19, 2016, 18 pages.

"International Search Report and Written Opinion", Application No. PCT/US2016/030115, dated Aug. 8, 2016, 18 pages.

"International Search Report and Written Opinion", Application No. PCT/US2015/043949, dated Dec. 1, 2015, 18 pages.

"Non-Final Office Action", U.S. Appl. No. 14/312,486, dated Oct. 23, 2015, 25 pages.

"Non-Final Office Action", U.S. Appl. No. 14/504,038, dated Feb. 26, 2016, 22 pages.

"Non-Final Office Action", U.S. Appl. No. 14/504,061, dated Nov. 4, 2015, 8 pages.

"Non-Final Office Action", U.S. Appl. No. 14/582,896, dated Jun. 29, 2016, 9 pages.

"Non-Final Office Action", U.S. Appl. No. 14/666,155, dated Aug. 24, 2016, 9 pages.

"Non-Final Office Action", U.S. Appl. No. 14/681,625, dated Aug. 12, 2016, 9 pages.

"Non-Final Office Action", U.S. Appl. No. 14/930,220, dated Sep. 14, 2016, 15 pages.

(56) References Cited

OTHER PUBLICATIONS

"Notice of Allowance", U.S. Appl. No. 14/504,061, dated Sep. 12, 2016, 7 pages.
"Philips Vital Signs Camera", Retrieved From: <http://www.vitalsignscamera.com/> Apr. 15, 2015, Jul. 17, 2013, 2 pages.
"Restriction Requirement", U.S. Appl. No. 14/666,155, dated Jul. 22, 2016, 5 pages.
"The Instant Blood Pressure app estimates blood pressure with your smartphone and our algorithm", Retrieved at: http://www.instantbloodpressure.com/—on Jun. 23, 2016, 6 pages.
Arbabian,"A 94GHz mm-Wave to Baseband Pulsed-Radar for Imaging and Gesture Recognition", 2012 IEEE, 2012 Symposium on VLSI Circuits Digest of Technical Papers, 2012, 2 pages.
Balakrishnan,"Detecting Pulse from Head Motions in Video", In Proceedings: CVPR '13 Proceedings of the 2013 IEEE Conference on Computer Vision and Pattern Recognition Available at: <http://people.csail.mit.edu/mrub/vidmag/papers/Balakrishnan_Detecting_Pulse_from_2013_CVPR_paper.pdf>, Jun. 23, 2013, 8 pages.
Couderc,"Detection of Atrial Fibrillation using Contactless Facial Video Monitoring", In Proceedings: Heart Rhythm Society, vol. 12, Issue 1 Available at: <http://www.heartrhythmjournal.com/article/S1547-5271(14)00924-2/pdf>, Jan. 2015, 7 pages.
Espina,"Wireless Body Sensor Network for Continuous Cuff-less Blood Pressure Monitoring", International Summer School on Medical Devices and Biosensors, 2006, Sep. 2006, 5 pages.
Godana,"Human Movement Characterization in Indoor Environment using GNU Radio Based Radar", Retrieved at: http://repository.tudelft.nl/islandora/object/uuid:414e1868-dd00-4113-9989-4c213f1f7094?collection=education, Nov. 30, 2009, 100 pages.
He,"A Continuous, Wearable, and Wireless Heart Monitor Using Head Ballistocardiogram (BCG) and Head Electrocardiogram (ECG) with a Nanowatt ECG Heartbeat Detection Circuit", In Proceedings: Thesis, Department of Electrical Engineering and Computer Science, Massachusetts Institute of Technology Available at: <http://dspace.mit.edu/handle/1721.1/79221>, Feb. 2013, 137 pages.
Holleis,"Evaluating Capacitive Touch Input on Clothes", Proceedings of the 10th International Conference on Human Computer Interaction, Jan. 1, 2008, 10 pages.
Nakajima,"Development of Real-Time Image Sequence Analysis for Evaluating Posture Change and Respiratory Rate of a Subject in Bed", In Proceedings: Physiological Measurement, vol. 22, No. 3 Retrieved From: <http://iopscience.iop.org/0967-3334/22/3/401/pdf/0967-3334_22_3_401.pdf> Feb. 27, 2015, Aug. 2001, 8 pages.
Patel,"Applications of Electrically Conductive Yarns in Technical Textiles", International Conference on Power System Technology (POWECON), Oct. 30, 2012, 6 pages.
Poh,"A Medical Mirror for Non-contact Health Monitoring", In Proceedings: ACM SIGGRAPH Emerging Technologies Available at: <http://affect.media.mit.edu/pdfs/11.Poh-etal-SIGGRAPH.pdf>, 2011, 1 page.
Poh,"Non-contact, Automated Cardiac Pulse Measurements Using Video Imaging and Blind Source Separation.", In Proceedings: Optics Express, vol. 18, No. 10.
Available at: <http://www.opticsinfobase.org/view_article.cfm?gotourl=http%3A%2F%2Fwww%2Eopticsinfobase%2Eorg%2FDirectPDFAccess%2F77B04D55%2DBC95%2D6937%2D5BAC49A426378C02%5F199381%2Foe%2D18%2D10%2D10762%2Ep, May 7, 2010, 13 pages.
Pu,"Whole-Home Gesture Recognition Using Wireless Signals", MobiCom '13 Proceedings of the 19th annual international conference on Mobile computing & networking, Aug. 27, 2013, 12 pages.
Wang,"Exploiting Spatial Redundancy of Image Sensor for Motion Robust rPPG", In Proceedings: IEEE Transactions on Biomedical Engineering, vol. 62, Issue 2, Jan. 19, 2015, 11 pages.
Wang,"Micro-Doppler Signatures for Intelligent Human Gait Recognition Using a UWB Impulse Radar", 2011 IEEE International Symposium on Antennas and Propagation (APSURSI), Jul. 3, 2011, pp. 2103-2106.
Wijesiriwardana,"Capacitive Fibre-Meshed Transducer for Touch & Proximity Sensing Applications", IEEE Sensors Journal, IEEE Service Center, Oct. 1, 2005, 5 pages.
Zhadobov, "Millimeter-wave Interactions with the Human Body: State of Knowledge and Recent Advances", International Journal of Microwave and Wireless Technologies, Mar. 1, 2011, 11 pages.
Zhang,"Study of the Structural Design and Capacitance Characteristics of Fabric Sensor", Advanced Materials Research (vols. 194-196), Feb. 21, 2011, 8 pages.
"Final Office Action", U.S. Appl. No. 15/286,512, dated Dec. 26, 2018, 15 pages.
"Foreign Office Action", UK Application No. 1620891.0, dated Dec. 6, 2018, 5 pages.
"International Preliminary Report on Patentability", PCT Application No. PCT/US2016/063874, dated Nov. 29, 2018, 12 pages.
"International Preliminary Report on Patentability", PCT Application No. PCT/US2017/032733, dated Nov. 29, 2018, 7 pages.
"Non-Final Office Action", U.S. Appl. No. 14/959,901, dated Oct. 11, 2018, 22 pages.
"Non-Final Office Action", U.S. Appl. No. 15/287,308, dated Oct. 15, 2018, 18 pages.
"Non-Final Office Action", U.S. Appl. No. 15/286,152, dated Oct. 19, 2018, 27 pages.
"Non-Final Office Action", U.S. Appl. No. 15/286,837, dated Oct. 26, 2018, 10 pages.
"Non-Final Office Action", U.S. Appl. No. 15/286,537, dated Nov. 19, 2018, 18 pages.
"Non-Final Office Action", U.S. Appl. No. 15/287,155, dated Dec. 10, 2018, 12 pages.
"Notice of Allowance", U.S. Appl. No. 15/595,649, dated Jan. 3, 2019, 5 pages.
"Notice of Allowance", U.S. Appl. No. 15/142,689, dated Oct. 30, 2018, 9 pages.
"Notice of Allowance", U.S. Appl. No. 15/287,200, dated Nov. 6, 2018, 19 pages.
"Preliminary Report on Patentability", PCT Application No. PCT/US2016/062082, dated Nov. 15, 2018, 8 pages.
"Restriction Requirement", U.S. Appl. No. 15/462,957, dated Jan. 4, 2019, 6 pages.
"Written Opinion", PCT Application No. PCT/US2017/051663, dated Oct. 12, 2018, 8 pages.
Gürbüz, et al., "Detection and Identification of Human Targets in Radar Data", Proc. SPIE 6567, Signal Processing, Sensor Fusion, and Target Recognition XVI, 656701, May 7, 2007, 12 pages.
"Apple Watch Used Four Sensors to Detect your Pulse", retrieved from http://www.theverge.com/2014/9/9/6126991 / apple-watch-four-back-sensors-detect-activity on Sep. 23, 2017 as cited in PCT search report for PCT Application No. PCT/US2016/026756 dated Nov. 10, 2017; The Verge, paragraph 1, Sep. 9, 2014, 4 pages.
"Clever Toilet Checks on Your Health", CNN.Com; Technology, Jun. 28, 2005, 2 pages.
"Final Office Action", U.S. Appl. No. 14/681,625, dated Dec. 7, 2016, 10 pages.
"Final Office Action", U.S. Appl. No. 15/287,253, dated Apr. 2, 2019, 10 pages.
"Final Office Action", U.S. Appl. No. 15/287,155, dated Apr. 10, 2019, 11 pages.
"Final Office Action", U.S. Appl. No. 14/731,195, dated Oct. 11, 2018, 12 pages.
"Final Office Action", U.S. Appl. No. 14/715,454, dated Sep. 7, 2017, 14 pages.
"Final Office Action", U.S. Appl. No. 14/720,632, dated Jan. 9, 2018, 18 pages.
"Final Office Action", U.S. Appl. No. 14/959,901, dated May 30, 2019, 18 pages.
"Final Office Action", U.S. Appl. No. 14/715,454, dated Apr. 17, 2018, 19 pages.
"Final Office Action", U.S. Appl. No. 15/286,537, dated Apr. 19, 2019, 21 pages.
"Final Office Action", U.S. Appl. No. 15/287,308, dated Feb. 8, 2019, 23 pages.
"Final Office Action", U.S. Appl. No. 14/599,954, dated Aug. 10, 2016, 23 pages.

(56) References Cited

OTHER PUBLICATIONS

"Final Office Action", U.S. Appl. No. 14/699,181, dated May 14, 2018, 41 pages.
"Final Office Action", U.S. Appl. No. 14/715,793, dated Sep. 12, 2017, 7 pages.
"Final Office Action", U.S. Appl. No. 14/809,901, dated Dec. 13, 2018, 7 pages.
"First Action Interview OA", U.S. Appl. No. 14/715,793, dated Jun. 21, 2017, 3 pages.
"First Action Interview Office Action", U.S. Appl. No. 15/142,471, dated Feb. 5, 2019, 29 pages.
"First Action Interview Office Action", U.S. Appl. No. 14/731,195, dated Jun. 21, 2018, 4 pages.
"First Action Interview Pilot Program Pre-Interview Communication", U.S. Appl. No. 14/731,195, dated Aug. 1, 2017, 3 pages.
"First Examination Report", GB Application No. 1621332.4, dated May 16, 2017, 7 pages.
"Foreign Office Action", Chinese Application No. 201580034536.8, dated Oct. 9, 2018.
"Foreign Office Action", KR Application No. 10-2016-7036023, dated Aug. 11, 2017, 10 pages.
"Foreign Office Action", Chinese Application No. 201580036075.8, dated Jul. 4, 2018, 14 page.
"Foreign Office Action", CN Application No. 201580034908.7, dated Jul. 3, 2018, 17 pages.
"Foreign Office Action", JP App. No. 2016-567813, dated Jan. 16, 2018, 3 pages.
"Foreign Office Action", Korean Application No. 10-2016-7036015, dated Oct. 15, 2018, 3 pages.
"Foreign Office Action", Japanese Application No. 2018501256, dated Feb. 26, 2019, 3 pages.
"Foreign Office Action", Japanese Application No. 2016-567839, dated Apr. 3, 2018, 3 pages.
"Foreign Office Action", KR Application No. 10-2016-7035397, dated Sep. 20, 2017, 5 pages.
"Foreign Office Action", Korean Application No. 1020187012629, dated May 24, 2018, 6 pages.
"Foreign Office Action", EP Application No. 15170577.9, dated May 30, 2017, 7 pages.
"Foreign Office Action", Korean Application No. 10-2016-7036396, dated Jan. 3, 2018, 7 pages.
"Foreign Office Action", JP Application No. 2016567813, dated Sep. 22, 2017, 8 pages.
"Foreign Office Action", Japanese Application No. 2018021296, dated Dec. 25, 2018, 8 pages.
"Foreign Office Action", EP Application No. 15754323.2, dated Mar. 9, 2018, 8 pages.
"International Preliminary Report on Patentability", PCT Application No. PCT/US2016/026756, dated Oct. 19, 2017, 8 pages.
"International Search Report and Written Opinion", PCT Application No. PCT/US2016/065295, dated Mar. 14, 2017, 12 pages.
"International Search Report and Written Opinion", Application No. PCT/US2016/042013, dated Oct. 26, 2016, 12 pages.
"International Search Report and Written Opinion", Application No. PCT/US2016/034366, dated Nov. 17, 2016, 13 pages.
"International Search Report and Written Opinion", Application No. PCT/US2016/033342, dated Oct. 27, 2016, 20 pages.
"Life:X Lifestyle eXplorer", Retrieved from <https://web.archive.org/web/20150318093841/http://research.microsoft.com/en-us/projects/lifex >, Feb. 3, 2017, 2 pages.
"Non-Final Office Action", U.S. Appl. No. 15/596,702, dated Jan. 4, 2019, 10 pages.
"Non-Final Office Action", U.S. Appl. No. 14/666,155, dated Feb. 3, 2017, 12 pages.
"Non-Final Office Action", U.S. Appl. No. 15/424,263, dated May 23, 2019, 12 pages.
"Non-Final Office Action", U.S. Appl. No. 14/809,901, dated May 24, 2018, 13 pages.
"Non-Final Office Action", U.S. Appl. No. 15/462,957, dated May 24, 2019, 14 pages.
"Non-Final Office Action", U.S. Appl. No. 16/238,464, dated Mar. 7, 2019, 15 pages.
"Non-Final Office Action", U.S. Appl. No. 14/720,632, dated Jun. 14, 2017, 16 pages.
"Non-Final Office Action", U.S. Appl. No. 14/715,454, dated Jan. 11, 2018, 16 pages.
"Non-Final Office Action", U.S. Appl. No. 14/599,954, dated Jan. 26, 2017, 16 pages.
"Non-Final Office Action", U.S. Appl. No. 14/599,954, dated Feb. 2, 2016, 17 pages.
"Non-Final Office Action", U.S. Appl. No. 14/720,632, dated May 18, 2018, 20 pages.
"Non-Final Office Action", U.S. Appl. No. 14/699,181, dated Oct. 18, 2017, 33 pages.
"Non-Final Office Action", U.S. Appl. No. 15/166,198, dated Feb. 21, 2019, 48 pages.
"Non-Final Office Action", U.S. Appl. No. 14/681,625, dated Mar. 6, 2017, 7 pages.
"Non-Invasive Quantification of Peripheral Arterial Volume Distensibilitiy and its Non-Lineaer Relationship with Arterial Pressure", Journal of Biomechanics, Pergamon Press, vol. 42, No. 8; as cited in the search report for PCT/US2016/013968 citing the whole document, but in particular the abstract, May 29, 2009, 2 pages.
"Notice of Allowance", U.S. Appl. No. 14/599,954, dated May 24, 2017, 11 pages.
"Notice of Allowance", U.S. Appl. No. 15/286,512, dated Apr. 9, 2019, 14 pages.
"Notice of Allowance", U.S. Appl. No. 15/286,152, dated Mar. 5, 2019, 23 pages.
"Notice of Allowance", U.S. Appl. No. 14/715,793, dated Jul. 6, 2018, 5 pages.
"Notice of Allowance", U.S. Appl. No. 15/286,495, dated Jan. 17, 2019, 5 pages.
"Notice of Allowance", U.S. Appl. No. 14/715,793, dated Dec. 18, 2017, 5 pages.
"Notice of Allowance", U.S. Appl. No. 14/666,155, dated Feb. 20, 2018, 5 pages.
"Notice of Allowance", U.S. Appl. No. 15/703,511, dated Apr. 16, 2019, 5 pages.
"Notice of Allowance", U.S. Appl. No. 14/666,155, dated Jul. 10, 2017, 7 pages.
"Notice of Allowance", U.S. Appl. No. 14/681,625, dated Jun. 7, 2017, 7 pages.
"Notice of Allowance", U.S. Appl. No. 15/286,837, dated Mar. 6, 2019, 7 pages.
"Notice of Allowance", U.S. Appl. No. 14/681,625, dated Oct. 23, 2017, 8 pages.
"Notice of Allowance", U.S. Appl. No. 15/142,829, dated Feb. 6, 2019, 8 pages.
"Notice of Allowance", U.S. Appl. No. 14/504,137, dated Feb. 6, 2019, 9 pages.
"Pre-Interview Communication", U.S. Appl. No. 15/142,471, dated Dec. 12, 2018, 3 pages.
"Pre-Interview Communication", U.S. Appl. No. 14/715,793, dated Mar. 20, 2017, 3 pages.
"Pre-Interview Communication", U.S. Appl. No. 14/715,454, dated Apr. 14, 2017, 3 pages.
"Pre-Interview Communication", U.S. Appl. No. 15/703,511, dated Feb. 11, 2019, 5 pages.
"Pre-Interview Communication", U.S. Appl. No. 15/917,238, dated May 1, 2019, 6 pages.
"Pre-Interview Office Action", U.S. Appl. No. 14/731,195, dated Dec. 20, 2017, 4 pages.
"Preliminary Report on Patentability", PCT Application No. PCT/US2016/065295, dated Jul. 24, 2018, 18 pages.
"Preliminary Report on Patentability", PCT Application No. PCT/US2016/042013, dated Jan. 30, 2018, 7 pages.
"Preliminary Report on Patentability", PCT Application No. PCT/US2016/032307, dated Dec. 7, 2017, 9 pages.
"Pressure-Volume Loop Analysis in Cardiology", retrieved from https://en.wikipedia.org/w/index.php?title=Pressure-volume loop analysis in card iology&oldid=636928657 on Sep. 23, 2017; Obtained

(56) References Cited

OTHER PUBLICATIONS per link provided in search report from PCT/US2016/01398 dated Jul. 28, 2016, Dec. 6, 2014, 10 pages.
"Restriction Requirement", U.S. Appl. No. 15/352,194, dated Feb. 6, 2019, 8 pages.
"The Dash smart earbuds play back music, and monitor your workout", Retrieved from < http://newatlas.com/bragi-dash-tracking-earbuds/30808/>, Feb. 13, 2014, 3 pages.
"Thermofocus No Touch Forehead Thermometer", Technimed, Internet Archive. Dec. 24, 2014. https://web.archive.org/web/20141224070848/http://www.tecnimed.it:80/thermofocus-forehead-thermometer-H1N1-swine-flu.html, Dec. 24, 2018, 4 pages.
"Written Opinion", PCT Application No. PCT/US2016/042013, dated Feb. 2, 2017, 6 pages.
"Written Opinion", PCT Application No. PCT/US2016/026756, dated Nov. 10, 2016, 7 pages.
"Written Opinion", PCT Application No. PCT/US2016/065295, dated Apr. 13, 2018, 8 pages.
"Written Opinion", PCT Application PCT/US2016/013968, dated Jul. 28, 2016, 9 pages.
Antonimuthu, "Google's Project Soli brings Gesture Control to Wearables using Radar", YouTube[online], Available from https://www.youtube.com/watch?v=czJfcgvQcNA as accessed on May 9, 2017; See whole video, especially 6:05-6:35.
Duncan, David P. "Motion Compensation of Synthetic Aperture Radar", Microwave Earth Remote Sensing Laboratory, Brigham Young University, Apr. 15, 2003, 5 pages.
Garmatyuk, Dmitriy S. et al., "Ultra-Wideband Continuous-Wave Random Noise Arc-SAR", IEEE Transaction on Geoscience and Remote Sensing, vol. 40, No. 12, Dec. 2002, Dec. 2002, 10 pages.
Geisheimer, Jonathan L. et al., "A Continuous-Wave (CW) Radar for Gait Analysis", IEEE 2001, 2001, 5 pages.
Ishijima, Masa "Unobtrusive Approaches to Monitoring Vital Signs at Home", Medical & Biological Engineering and Computing, Springer, Berlin, DE, vol. 45, No. 11 as cited in search report for PCT/US2016/013968 dated Jul. 28, 2016, Sep. 26, 2007, 3 pages.
Klabunde, Richard E. "Ventricular Pressure-Volume Loop Changes in Valve Disease", Retrieved From <https://web.archive.org/web/20101201185256/http://cvphysiology.com/Heart%20Disease/HD009.htm>, Dec. 1, 2010, 8 pages.
Kubota, Yusuke et al., "A Gesture Recognition Approach by using Microwave Doppler Sensors", IPSJ SIG Technical Report, 2009 (6), Information Processing Society of Japan, Apr. 15, 2010, pp. 1-8, Apr. 15, 2010, 13 pages.
Matthews, Robert J. "Venous Pulse", Retrieved at: http://www.rjmatthewsmd.com/Definitions/venous_pulse.htm—on Nov. 30, 2016, Apr. 14, 2013, 7 pages.
Otto, Chris et al., "System Architecture of a Wireless Body Area Sensor Network for Ubiquitous Health Monitoring", Journal of Mobile Multimedia; vol. 1, No. 4, Jan. 10, 2006, 20 pages.
Palese, et al., "The Effects of Earphones and Music on the Temperature Measured by Infrared Tympanic Thermometer: Preliminary Results", ORL—head and neck nursing: official journal of the Society of Otorhinolaryngology and Head-Neck Nurses 32.2, Jan. 1, 2013, pp. 8-12.
Pu, Qifan et al., "Whole-Home Gesture Recognition Using Wireless Signals", MobiCom'13, Sep. 30-Oct. 4, Miami, FL, USA, 2013, 12 pages.
Pu, Qifan et al., "Whole-Home Gesture Recognition Using Wireless Signals", Proceedings of the 19th annual international conference on Mobile computing & networking (MobiCom'13), US, ACM, Sep. 30, 2013, pp. 27-38, Sep. 30, 2013, 12 pages.
Zhadobov, Maxim et al., "Millimeter-Wave Interactions with the Human Body: State of Knowledge and Recent Advances", International Journal of Microwave and Wireless Technologies, p. 1 of 11. # Cambridge University Press and the European Microwave Association, 2011 doi:10.1017/S1759078711000122, 2011.
"Advisory Action", U.S. Appl. No. 14/504,139, dated Aug. 28, 2017, 3 pages.
"Final Office Action", U.S. Appl. No. 14/959,901, dated Aug. 25, 2017, 19 pages.
"Final Office Action", U.S. Appl. No. 15/403,066, dated Oct. 5, 2017, 31 pages.
"Non-Final Office Action", U.S. Appl. No. 15/093,533, dated Aug. 24, 2017, 18 pages.
"Non-Final Office Action", U.S. Appl. No. 15/142,619, dated Aug. 25, 2017, 16 pages.
"Non-Final Office Action", U.S. Appl. No. 14/959,799, dated Sep. 8, 2017, 16 pages.
"Non-Final Office Action", U.S. Appl. No. 15/398,147, dated Sep. 8, 2017, 7 pages.
"Non-Final Office Action", U.S. Appl. No. 14/518,863, dated Sep. 29, 2017, 20 pages.
"Non-Final Office Action", U.S. Appl. No. 15/142,689, dated Oct. 4, 2017, 18 pages.
"Pre-Interview Office Action", U.S. Appl. No. 14/862,409, dated Sep. 15, 2017, 16 pages.
"Written Opinion", PCT Application No. PCT/US2016/055671, dated Apr. 13, 2017, 8 pages.
"Written Opinion", PCT Application No. PCT/US2017/032733, dated Jul. 26, 2017, 5 pages.
"Final Office Action", U.S. Appl. No. 14/959,799, dated Jan. 4, 2018, 17 pages.
"Final Office Action", U.S. Appl. No. 14/959,730, dated Nov. 22, 2017, 16 pages.
"International Search Report and Written Opinion", PCT/US2017/047691, dated Nov. 16, 2017, 13.
"International Search Report and Written Opinion", PCT Application No. PCT/US2017/051663, dated Nov. 29, 2017, 16 pages.
"Non-Final Office Action", U.S. Appl. No. 14/504,121, dated Jan. 2, 2018, 19 pages.
"Non-Final Office Action", U.S. Appl. No. 14/959,901, dated Jan. 8, 2018, 21 pages.
"Non-Final Office Action", U.S. Appl. No. 14/504,139, dated Oct. 18, 2017, 12 pages.
"Non-Final Office Action", U.S. Appl. No. 15/595,649, dated Oct. 31, 2017, 16 pages.
"Non-Final Office Action", U.S. Appl. No. 14/862,409, dated Dec. 14, 2017, 17 pages.
"Notice of Allowance", U.S. Appl. No. 15/403,066, dated Jan. 8, 2018, 18 pages.
"Notice of Allowance", U.S. Appl. No. 14/874,955, dated Oct. 20, 2017, 7 pages.
"Notice of Allowance", U.S. Appl. No. 15/398,147, dated Nov. 15, 2017, 8 pages.
"Notice of Publication", U.S. Appl. No. 15/703,511, dated Jan. 4, 2018, 1 page.
"Restriction Requirement", U.S. Appl. No. 15/362,359, dated Jan. 8, 2018, 5 pages.
Bondade, et al., "A linear-assisted DC-DC hybrid power converter for envelope tracking RF power amplifiers", 2014 IEEE Energy Conversion Congress and Exposition (ECCE), IEEE, Sep. 14, 2014, pp. 5769-5773, XP032680873, DOI: 10.1109/ECCE.2014.6954193, Sep. 14, 2014, 5 pages.
Fan, et al., "Wireless Hand Gesture Recognition Based on Continuous-Wave Doppler Radar Sensors", IEEE Transactions on Microwave Theory and Techniques, Plenum, USA, vol. 64, No. 11, Nov. 1, 2016 (Nov. 1, 2016), pp. 4012-4012, XP011633246, ISSN: 0018-9480, DOI: 10.1109/TMTT.2016.2610427, Nov. 1, 2016, 9 pages.
Lien, et al., "Soli: Ubiquitous Gesture Sensing with Millimeter Wave Radar", ACM Transactions on Graphics (TOG), ACM, Us, vol. 35, No. 4, Jul. 11, 2016 (Jul. 11, 2016), pp. 1-19, XP058275791, ISSN: 0730-0301, DOI: 10.1145/2897824.2925953, Jul. 11, 2016, 19 pages.
Martinez-Garcia, et al., "Four-quadrant linear-assisted DC/DC voltage regulator", Analog Integrated Circuits and Signal Processing, Springer New York LLC, US, vol. 88, No. 1, Apr. 23, 2016 (Apr. 23, 2016), pp. 151-160, XP035898949, ISSN: 0925-1030, DOI: 10.1007/S10470-016-0747-8, Apr. 23, 2016, 10 pages.

(56) References Cited

OTHER PUBLICATIONS

Skolnik, "CW and Frequency-Modulated Radar", In: "Introduction to Radar Systems", Jan. 1, 1981 (Jan. 1, 1981), McGraw Hill, XP055047545, ISBN: 978-0-07-057909-5 pp. 68-100, p. 95-p. 97, Jan. 1, 1981, 18 pages.
Zheng, et al., "Doppler Bio-Signal Detection Based Time-Domain Hand Gesture Recognition", 2013 IEEE MTT-S International Microwave Workshop Series on RF and Wireless Technologies for Biomedical and Healthcare Applications (IMWS-BIO), IEEE, Dec. 9, 2013 (Dec. 9, 2013), p. 3, XP032574214, DOI: 10.1109/IMWS-BIO.2013.6756200, Dec. 9, 2013, 3 Pages.
"Final Office Action", U.S. Appl. No. 14/518,863, dated Apr. 5, 2018, 21 pages.
"Final Office Action", U.S. Appl. No. 14/504,139, dated May 1, 2018, 14 pages.
"Final Office Action", U.S. Appl. No. 15/595,649, dated May 23, 2018, 13 pages.
"Final Office Action", U.S. Appl. No. 15/142,689, dated Jun. 1, 2018, 16 pages.
"Final Office Action", U.S. Appl. No. 14/874,955, dated Jun. 11, 2018, 9 pages.
"Final Office Action", U.S. Appl. No. 14/959,901, dated Jun. 15, 2018, 21 pages.
"Final Office Action", U.S. Appl. No. 15/286,152, dated Jun. 26, 2018, 25 pages.
"Final Office Action", U.S. Appl. No. 15/267,181, dated Jun. 7, 2018, 31 pages.
"First Action Interview Office Action", U.S. Appl. No. 15/166,198, dated Apr. 25, 2018, 8 pages.
"Foreign Office Action", European Application No. 16784352.3, dated May 16, 2018, 3 pages.
"Foreign Office Action", Chinese Application No. 201721290290.3, dated Jun. 6, 2018, 3 pages.
"Non-Final Office Action", U.S. Appl. No. 15/287,253, dated Apr. 5, 2018, 17 pages.
"Non-Final Office Action", U.S. Appl. No. 15/586,174, dated Jun. 18, 2018, 7 pages.
"Notice of Allowance", U.S. Appl. No. 14/862,409, dated Jun. 6, 2018, 7 pages.
"Pre-Interview Communication", U.S. Appl. No. 15/362,359, dated May 17, 2018, 4 pages.
"Preliminary Report on Patentability", PCT Application No. PCT/US2016/055671, dated Apr. 10, 2018, 9 pages.
"Written Opinion", PCT Application No. PCT/US2017/032733, dated Jul. 24, 2017, 5 pages.
"Corrected Notice of Allowance", U.S. Appl. No. 14/504,061, dated Dec. 27, 2016, 2 pages.
"Corrected Notice of Allowance", U.S. Appl. No. 14/582,896, dated Dec. 19, 2016, 2 pages.
"International Search Report and Written Opinion", Application No. PCT/US2016/024289, dated Aug. 25, 2016, 17 pages.
Cheng,"Smart Textiles: From Niche to Mainstream", IEEE Pervasive Computing, Jul. 2013, pp. 81-84.
Farringdon,"Wearable Sensor Badge & Sensor Jacket for Context Awareness", Third International Symposium on Wearable Computers, Oct. 1999, 7 pages.
Schneegass,"Towards a Garment OS: Supporting Application Development for Smart Garments", Wearable Computers, ACM, Sep. 2014, 6 pages.
"EP Appeal Decision", European Application No. 10194359.5, May 28, 2019, 20 pages.
"Final Office Action", U.S. Appl. No. 15/462,957, dated Nov. 8, 2019, 10 Pages.
"Foreign Office Action", Chinese Application No. 201611159602.7, dated Oct. 11, 2019, 20 pages.
"Foreign Office Action", Japanese Application No. 2018501256, dated Oct. 23, 2019, 5 pages.
"Foreign Office Action", Chinese Application No. 201611191179.9, dated Aug. 28, 2019, 10 pages.
"Foreign Office Action", British Application No. 1912334.8, dated Sep. 23, 2019, 5 pages.
"Galaxy S4 Air Gesture", Galaxy S4 Guides, retrieved from: https://allaboutgalaxys4.com/galaxy-s4-features-explained/air-gesture/ on Sep. 3, 2019, 4 pages.
"Non-Final Office Action", U.S. Appl. No. 15/791,044, dated Sep. 30, 2019, 22 Pages.
"Non-Final Office Action", U.S. Appl. No. 16/153,395, dated Oct. 22, 2019, 10 Pages.
"Notice of Allowance", U.S. Appl. No. 16/356,748, dated Oct. 17, 2019, 9 Pages.
"Notice of Allowance", U.S. Appl. No. 16/238,464, dated Nov. 4, 2019, 10 Pages.
"Notice of Allowance", U.S. Appl. No. 15/424,263, dated Nov. 14, 2019, 10 Pages.
"Samsung Galaxy S4 Air Gestures", Video retrieved from https://www.youtube.com/watch?v=375Hb87yGcg, May 7, 2013, 4 pages.
Amihood, et al., "Closed-Loop Manufacturing System Using Radar", Technical Disclosure Commons; Retrieved from http://www.tdcommons.org/dpubs_series/464, Apr. 17, 2017, 8 pages.
Karagozler, et al., "Embedding Radars in Robots to Accurately Measure Motion", Technical Disclosure Commons; Retrieved from http://www.tdcommons.org/dpubs_series/454, Mar. 30, 2017, 8 pages.
Lien, et al., "Embedding Radars in Robots for Safety and Obstacle Detection", Technical Disclosure Commons; Retrieved from http://www.tdcommons.org/dpubs_series/455, Apr. 2, 2017, 10 pages.
"Combined Search and Examination Report", GB Application No. 1620892.8, dated Apr. 6, 2017, 5 pages.
"Corrected Notice of Allowance", U.S. Appl. No. 14/930,220, dated Mar. 20, 2017, 2 pages.
"Corrected Notice of Allowance", U.S. Appl. No. 14/930,220, dated May 11, 2017, 2 pages.
"Final Office Action", U.S. Appl. No. 14/518,863, dated May 5, 2017, 18 pages.
"First Action Interview Office Action", U.S. Appl. No. 14/959,901, dated Apr. 14, 2017, 3 pages.
"International Preliminary Report on Patentability", Application No. PCT/US2015/050903, dated Apr. 13, 2017, 12 pages.
"International Search Report and Written Opinion", Application No. PCT/US2016/060399, dated Jan. 30, 2017, 11 pages.
"Non-Final Office Action", U.S. Appl. No. 14/504,038, dated Mar. 22, 2017, 33 pages.
"Non-Final Office Action", U.S. Appl. No. 15/398,147, dated Mar. 9, 2017, 10 pages.
"Non-Final Office Action", U.S. Appl. No. 15/403,066, dated May 4, 2017, 31 pages.
"Pre-Interview Communication", U.S. Appl. No. 15/343,067, dated Apr. 19, 2017, 3 pages.
"Textile Wire Brochure", Retrieved at: http://www.textile-wire.ch/en/home.html, dated Aug. 7, 2004, 17 pages.
Stoppa,"Wearable Electronics and Smart Textiles: A Critical Review", In Proceedings of Sensors, vol. 14, Issue 7, Jul. 7, 2014, pp. 11957-11992.
"Final Office Action", U.S. Appl. No. 15/142,471, dated Jun. 20, 2019, 26 pages.
"Final Office Action", U.S. Appl. No. 16/238,464, dated Jul. 25, 2019, 15 pages.
"First Action Interview Office Action", U.S. Appl. No. 15/917,238, dated Jun. 6, 2019, 6 pages.
"International Preliminary Report on Patentability", PCT Application No. PCT/US2017/051663, dated Jun. 20, 2019, 10 pages.
"Non-Final Office Action", U.S. Appl. No. 15/286,537, dated Sep. 3, 2019, 28 Pages.
"Notice of Allowance", U.S. Appl. No. 15/287,308, dated Jul. 17, 2019, 17 Pages.
"Notice of Allowance", U.S. Appl. No. 15/917,238, dated Aug. 21, 2019, 13 pages.
"Notice of Allowance", U.S. Appl. No. 16/389,402, dated Aug. 21, 2019, 7 Pages.
"Notice of Allowance", U.S. Appl. No. 15/287,253, dated Aug. 26, 2019, 13 Pages.
"Notice of Allowance", U.S. Appl. No. 15/352,194, dated Jun. 26, 2019, 8 pages.

(56) References Cited

OTHER PUBLICATIONS

"Notice of Allowance", U.S. Appl. No. 15/287,155, dated Jul. 25, 2019, 7 pages.
"Corrected Notice of Allowance", U.S. Appl. No. 15/362,359, dated Sep. 17, 2018, 10 pages.
"Final Office Action", U.S. Appl. No. 14/504,121, dated Jul. 9, 2018, 23 pages.
"Final Office Action", U.S. Appl. No. 15/166,198, dated Sep. 27, 2018, 33 pages.
"Foreign Office Action", Japanese Application No. 2018-501256, dated Jul. 24, 2018, 11 pages.
"Non-Final Office Action", U.S. Appl. No. 15/287,253, dated Sep. 7, 2018, 20 pages.
"Non-Final Office Action", U.S. Appl. No. 14/504,139, dated Oct. 5, 2018, 16 pages.
"Non-Final Office Action", U.S. Appl. No. 15/286,512, dated Jul. 19, 2018, 15 pages.
"Non-Final Office Action", U.S. Appl. No. 15/142,829, dated Aug. 16, 2018, 15 pages.
"Notice of Allowance", U.S. Appl. No. 15/362,359, dated Aug. 3, 2018, 8 pages.
"Notice of Allowance", U.S. Appl. No. 14/874,955, dated Oct. 4, 2018, 8 pages.
"Notice of Allowance", U.S. Appl. No. 15/142,619, dated Aug. 13, 2018, 9 pages.
"Notice of Allowance", U.S. Appl. No. 15/595,649, dated Sep. 14, 2018, 8 pages.
"Notice of Allowance", U.S. Appl. No. 15/586,174, dated Sep. 24, 2018, 5 pages.
"Pre-Interview Communication", U.S. Appl. No. 15/286,495, dated Sep. 10, 2018, 4 pages.
"Pre-Interview Communication", U.S. Appl. No. 15/287,359, dated Jul. 24, 2018, 2 pages.
"Restriction Requirement", U.S. Appl. No. 15/286,537, dated Aug. 27, 2018, 8 pages.
"Corrected Notice of Allowance", U.S. Appl. No. 14/312,486, dated Jan. 23, 2017, 4 pages.
"Corrected Notice of Allowance", U.S. Appl. No. 14/582,896, dated Feb. 6, 2017, 2 pages.
"Corrected Notice of Allowance", U.S. Appl. No. 14/582,896, dated Feb. 23, 2017, 2 pages.
"International Preliminary Report on Patentability", Application No. PCT/US2015/043963, dated Feb. 16, 2017, 12 pages.
"International Preliminary Report on Patentability", Application No. PCT/US2015/030388, dated Dec. 15, 2016, 12 pages.
"International Preliminary Report on Patentability", Application No. PCT/US2015/043949, dated Feb. 16, 2017, 13 pages.
"International Preliminary Report on Patentability", Application No. PCT/US2015/044774, date Mar. 2, 2017, 8 pages.
"International Search Report and Written Opinion", Application No. PCT/US2016/062082, dated Feb. 23, 2017, 12 pages.
"International Search Report and Written Opinion", Application No. PCT/US2016/055671, dated Dec. 1, 2016, 14 pages.
"Non-Final Office Action", U.S. Appl. No. 14/504,121, dated Jan. 9, 2017, 13 pages.
"Non-Final Office Action", U.S. Appl. No. 14/504,139, dated Jan. 27, 2017, 10 pages.
"Non-Final Office Action", U.S. Appl. No. 14/513,875, dated Feb. 21, 2017, 9 pages.
"Non-Final Office Action", U.S. Appl. No. 14/874,955, dated Feb. 27, 2017, 8 pages.
"Non-Final Office Action", U.S. Appl. No. 14/959,799, dated Jan. 27, 2017, 10 pages.
"Notice of Allowance", U.S. Appl. No. 14/930,220, dated Feb. 2, 2017, 8 pages.
"Pre-Interview Communication", U.S. Appl. No. 14/494,863, dated Jan. 27, 2017, 5 pages.
"Pre-Interview Communication", U.S. Appl. No. 14/959,730, dated Feb. 15, 2017, 3 pages.
"Pre-Interview Communication", U.S. Appl. No. 14/959,901, dated Feb. 10, 2017, 3 pages.
"Final Office Action", U.S. Appl. No. 15/142,619, dated Feb. 8, 2018, 15 pages.
"Final Office Action", U.S. Appl. No. 15/093,533, dated Mar. 21, 2018, 19 pages.
"First Action Interview Office Action", U.S. Appl. No. 15/286,152, dated Mar. 1, 2018, 5 pages.
"Foreign Office Action", Chinese Application No. 201721290290.3, dated Mar. 9, 2018, 2 pages.
"Non-Final Office Action", U.S. Appl. No. 15/267,181, dated Feb. 8, 2018, 29 pages.
"Non-Final Office Action", U.S. Appl. No. 14/874,955, dated Feb. 8, 2018, 7 pages.
"Notice of Allowance", U.S. Appl. No. 14/959,730, dated Feb. 22, 2018, 8 pages.
"Pre-Interview Communication", U.S. Appl. No. 15/166,198, dated Mar. 8, 2018, 8 pages.
"Pre-Interview First Office Action", U.S. Appl. No. 15/286,152, dated Feb. 8, 2018, 4 pages.
"Corrected Notice of Allowance", U.S. Appl. No. 14/312,486, dated Oct. 28, 2016, 4 pages.
"Non-Final Office Action", U.S. Appl. No. 14/518,863, dated Oct. 14, 2016, 16 pages.
"Notice of Allowance", U.S. Appl. No. 14/312,486, dated Oct. 7, 2016, 15 pages.
"Notice of Allowance", U.S. Appl. No. 14/582,896, dated Nov. 7, 2016, 5 pages.
"Pre-Interview Communication", U.S. Appl. No. 14/513,875, dated Oct. 21, 2016, 3 pages.
Pu, "Gesture Recognition Using Wireless Signals", Oct. 2014, pp. 15-18.
"Pre-Interview Communication", U.S. Appl. No. 16/401,611, dated Apr. 13, 2020, 4 Pages.

\* cited by examiner

APPLICATION-BASED SIGNAL PROCESSING PARAMETERS IN RADAR-BASED DETECTION

PRIORITY

This application claims priority to U.S. Provisional Patent Application Ser. No. 62/237,975 filed on Oct. 6, 2015, the disclosure of which is incorporated by reference herein in its entirety.

BACKGROUND

This background description is provided for the purpose of generally presenting the context of the disclosure. Unless otherwise indicated herein, material described in this section is neither expressly nor impliedly admitted to be prior art to the present disclosure or the appended claims.

Many radar systems use fixed designs that are specialized for a particular purpose. Accordingly, these fixed systems apply design trade-offs optimized towards the particular purpose. While this makes the radar system operate as intended for the particular purpose, it also makes the radar system unsuitable for other applications. Thus, these fixed designs limit how and where a radar system can be utilized.

SUMMARY

This Summary is provided to introduce a selection of concepts in a simplified form that are further described below in the Detailed Description. This Summary is not intended to identify key features or essential features of the claimed subject matter.

Various embodiments enable dynamic reconfiguration of a radar-based detection system based upon an operating context of an associated device. A first application with execution priority on a device dynamically configures the radar-based detection system to emit a radar field suitable for a first operating context associated with the first application. When a second application assumes execution priority, it dynamically reconfigures the radar-based detection suitable for a second operating context associated with the second application, such as by reconfiguring the radar field emitted and/or processing parameters used.

BRIEF DESCRIPTION OF THE DRAWINGS

Various aspects of application-based signal processing parameters are described with reference to the following drawings. The same numbers are used throughout the drawings to reference like features and components.

DETAILED DESCRIPTION

Overview

Various embodiments utilize application-based processing parameters to dynamically configure a radar-based detection system based upon an operating context of an associated device. A first application with execution priority on a device dynamically configures the radar-based detection system to emit a radar field suitable for a first operating context associated with the first application. The first application can also dynamically configure processing parameters of the radar-based detection system, such as digital signal processing parameters and machine-learning parameters. In some cases, a second application on the device assumes execution priority over the first application. When the second application assumes execution priority, it dynamically reconfigures the radar-based detection system to emit a radar field suitable to a second operating context associated with the second application. Alternately or additionally, the second application dynamically reconfigures processing parameters used of the radar-based detection system based upon the second operating context of the second application.

In the following discussion, an example environment is first described in which various embodiments can be employed. Following this is a discussion of example RF signal propagation properties and how they can be employed in accordance with one or more embodiments. After this, dynamic reconfiguration of a radar-based detection system based upon an operating context is described. Finally, an example device is described in which various embodiments of application-based configuration of processing parameters associated with a radar-based detection system can be employed.

Example Environment

Figure 1:
FIG. 1 illustrates example environments that employ application-based signal processing parameters in accordance with one or more embodiments.
Figure 1:
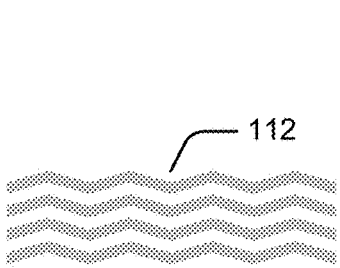
Figure 1:
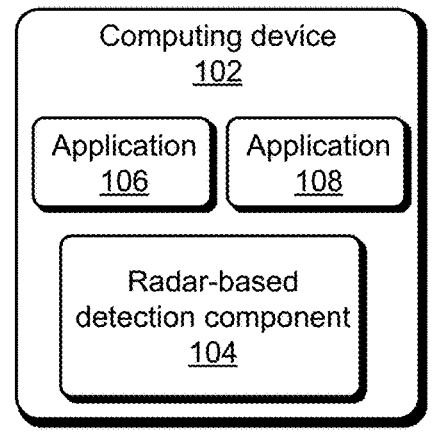
Figure 1:
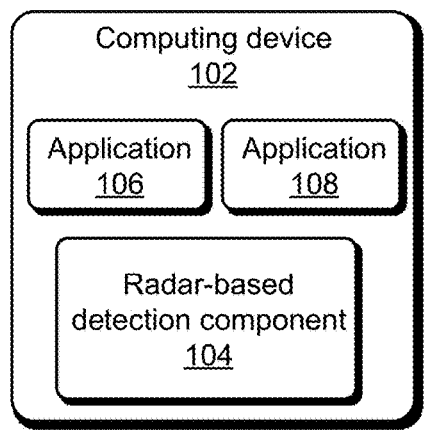
Figure 1:
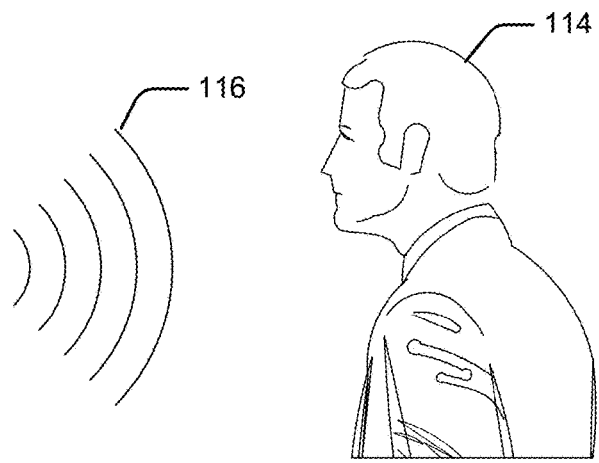

FIG. 1 illustrates example environment 100-1 and environment 100-2 in which dynamic reconfiguration of a radar-based detection system can be employed. Example environment 100-1 and environment 100-2 represent the same environment at different points in time. Accordingly, each environment shares the same elements. Here, environment 100-1 and environment 100-2 each include computing device 102 having a radar-based detection component 104 capable of wirelessly sensing, detecting, and recognizing gestures.

Radar-based detection component 104 represents functionality that wirelessly captures characteristics of a target object, and is illustrated as a hardware component of computing device 102. In some cases, radar-based detection component 104 not only captures characteristics about a target object, but additionally identifies a specific gesture from other gestures. Other times, radar-based detection component 104 can generate context information associated with an environment, such as room characteristics. Any suitable type of characteristic or gesture can be captured or identified, such as a size of a hand, objects included in a room, directional movement of a hand, a micro-gesture performed by all or a portion of a hand (e.g., a single-tap gesture, a double-tap gesture, a left-swipe, a forward-swipe, a right-swipe, a finger making a shape, and so forth), locating a head of a person, performing facial identification of a person, an eye movement, tongue movement, and so forth. The term micro-gesture is used to signify a gesture that can be identified from other gestures based on differences in movement using a scale on the order of millimeters to sub-millimeters. Alternately or additionally, radar-based detection component 104 can be configured to identify gestures on a larger scale than a micro-gesture (e.g., a macro-gesture that is identified by differences with a coarser resolution than a micro-gesture, such as differences measured in centimeters or meters), the presence of multiple persons in a room, and so forth.

Computing device 102 also includes application 106 and application 108. Here, each application is illustrated as being a software application that, when executing, generates a respective operating context of computing device 102. In additional to generating respective operating contexts of computing device 102, each application can have multiple operating contexts within themselves. In environment 100-1, computing device 102 operates with application 106 having execution priority over application 108, thus giving computing device 102 an operating context of application 106 being active. Similarly, in environment 100-2, application 108 has execution priority over application 106. When an application has execution priority over another, the application with execution priority has priority to the processor compared to other applications. In the context of radar-based detection systems, this additionally indicates the application with execution priority also has control over how the radar-based detection system is configured by altering various parameters, as further described herein.

Environment 100-1 includes hand 110 and signals 112. When application 106 has execution priority over application 108, such as the case of environment 100-1, application 106 configures radar-based detection component 104 based upon the context of application 106. Alternately or additionally, application 106 can configure radar-based detection component 104 based upon a context of environment 100-1, such as an environment which includes a known hand, an environment identified as a kitchen, and so forth. Thus, in environment 100-1, application 106 configures the radar field emitted by radar-based detection component 104 (illustrated here as signals 112). While not illustrated, application 106 can also configure processing algorithms, data extraction and/or classification, and other actions performed by radar-based detection component 104, as further described below.

Hand 110 represents target object that radar-based detection component 104 is in process of detecting. Here, hand 110 resides in free-space and has no physical devices attached to it that couple to, or communicate with, computing device 102 and/or radar-based detection component 104.

Signals 112 generally represent one or more RF signals transmitted and received by radar-based detection component 104. In some embodiments, radar-based detection component 104 emits a radar field or signal using a single antenna that is directed towards hand 110. In other embodiments, multiple radar signals are transmitted, each on a respective antenna. As a transmitted signal reaches hand 110, at least a portion reflects back to radar-based detection component 104 and is processed, as further described below. Signals 112 can have any suitable combination of energy level, carrier frequency, burst periodicity, pulse width, modulation type, waveform, phase relationship, and so forth. In some cases, some or all of the respective signals transmitted in signals 112 differ from one another to create a specific diversity scheme, such as a time diversity scheme that transmits multiple versions of a same signal at different points in time, a frequency diversity scheme that transmits signals using several different frequency channels, a space diversity scheme that transmits signals over different propagation paths, etc. Thus, the configuration of signals 112, as well as how reflected signals are processed by radar-based detection component 104, can be dynamically configured, controlled, or influenced by application 106.

Environment 100-2 represents environment 100-1 at a different point in time. Here, execution priority has switched from application 106 to application 108. Accordingly, application 108 has control over the configuration of radar-based detection component 104 and/or how the detection component operates. Environment 100-2 includes user 114, to whom hand 110 of environment 100-1 belongs. Instead of hand 110 being the desired target object of application 108, application 108 has an operating context that uses an identity associated with user 114 for security and/or log-in purposes. Since application 108 operates in a different context than application 106, the configuration of radar-based detection component 104 used by application 106 may not be adequate for application 108, or provide enough resolution to detect an identity of user 114. Thus, application 108 dynamically reconfigures various operating parameters of radar-based detection component 104 that are suitable to the operating context of application 108. Here, signals 116 are illustrated as being visually distinct from signals 112 to represent that radar-based detection component has a different configuration in environment 100-2 than environment 100-1, and is emitting a different radar field. As in the case of application 106, application 108 can alternately or additionally reconfigure processing parameters of radar-based detection component 104, as further described herein. When an application utilizes certain data, such as application 108 using a user's identity, the data may be treated in one or more ways before it is stored or used, so that personally identifiable information is removed. Thus, data such as a user's identity or facial recognition may be treated so that no personally identifiable information can be determined for the user, or a user's geographic location may be generalized where location information is obtained (such as to a city, postal code, or state level), so that a particular location of a user cannot be determined. Accordingly, the user may have control over what information is collected about the user, how that information is used, and what information is provided to the user.

Figure 2:
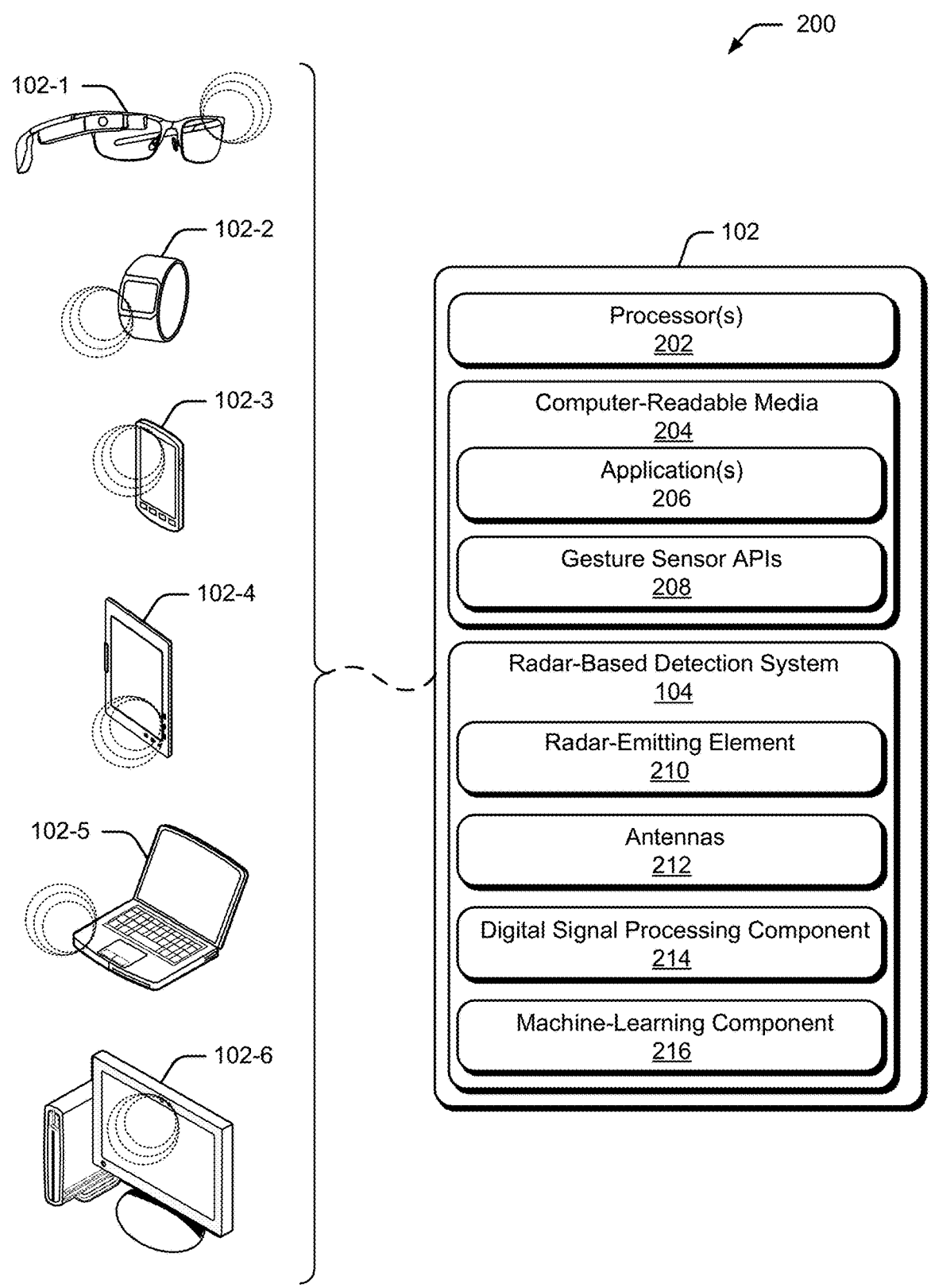
FIG. 2 illustrates an example implementation of a computing device of FIG. 1 in greater detail in accordance with one or more embodiments.

Having generally described an environment in which dynamic reconfiguration of a radar-based detection system based on an operating context may be implemented, now consider FIG. 2, which illustrates an example implementation of computing device 102 of FIG. 1 in greater detail. Computing device 102 represents any suitable type of computing device in which various embodiments can be implemented. In this example, various devices include, by way of example and not limitation: smart glasses 102-1, smart watch 102-2, mobile phone 102-3, tablet 102-4, laptop 102-5, and display monitor 102-6. It is to be appreciated that these are merely examples for illustrative purposes, and that any other suitable type of computing device can be utilized without departing from the scope of the claimed subject matter, such as a gaming console, a lighting system, an audio system, a refrigerator, a microwave, etc.

Computing device 102 includes processor(s) 202 and computer-readable storage media 204. Applications 206 and/or an operating system (not shown) embodied as computer-readable instructions on the computer-readable storage media 204 can be executed by the processor(s) 202 to invoke or interface with some or all of the functionalities described herein, such as through gesture sensor Application Programming Interfaces (APIs) 208.

Applications 206 represent software applications with separate operating contexts. Accordingly, some or all of the applications can have different forms of input, such as a first application requesting a micro-gesture input, a second application requesting presence detection input, a third application requesting facial recognition and/or user identity input, a forth application requesting navigation input and/or location input, and so forth. Thus, an operating context of an application can pertain to what sort of input or information the application is trying to detect or receive, such a person entering a room, identifying a user, etc. Alternately or additionally, different applications can be invoked based upon a determined operating environment of computing device 102. In some embodiments, when an application has execution priority, it has priority or control over how radar-based detection component emits a radar field, transforms capture data, extracts information from the captured data, applies a machine-learning algorithm model, and so forth. At times, an application can have multiple contexts in which it runs such that it reconfigures radar-based detection component for various iterations or information gathering stages within the application, as further described below. To configure these various parameters of a radar-based detection component, an application can utilize a programmatic interface into the component and/or utilize gesture sensor APIs 208 to send commands and receive back information.

Gesture sensor APIs 208 provide programming access into various routines and functionality incorporated into radar-based detection component 104. For instance, radar-based detection component 104 can have a programmatic interface (socket connection, shared memory, read/write registers, hardware interrupts, and so forth) that can be used in concert with gesture sensor APIs 208 to allow applications 206 to communicate with and/or configure radar-based detection component 104. In some embodiments, gesture sensor APIs 208 provide high-level access into radar-based detection component 104 in order to abstract implementation details and/or hardware access from a calling program, request notifications related to identified events, query for results, and so forth. Gesture sensor APIs 208 can also provide low-level access to radar-based detection component 104, where a calling program can control direct or partial hardware configuration of radar-based detection component 104.

High-level programming access implies programming access that requests high-level functionality without the calling application selecting or setting specific parameters, such as a call to "transmit a radar field to detect a micro-gesture" without any knowledge of hardware or algorithm configurations. Conversely, low-level programming access implies programming access that exposes how the functionality is achieved, such as by sending hardware parameters from within the calling application (e.g., "Send value '123' to register 'XYZ'"). These APIs enable programs, such as applications 206, to access radar-based detection component 104. For instance, gesture sensor APIs 208 can be used to register for, or request, an event notification when a particular micro-gesture has been detected, enable or disable target recognition in computing device 102, and so forth. Alternately or additionally, gesture sensor APIs 208 can be used to access various algorithms that reside on radar-based detection component 104 to configure algorithms, extract additional information (such as 3D tracking information, angular extent, reflectivity profiles from different aspects, correlations between transforms/features from different channels, and so forth), transition radar-based detection component 104 into a gesture-learning mode, and so forth.

Radar-based detection component 104 represents functionality that wirelessly detects target objects, such as gestures performed by a hand, presence of a user, objects included in a room, etc. Radar-based detection component 104 can be implemented as a chip embedded within computing device 102, such as a System-on-Chip (SoC). However, a radar-based detection component can be implemented in any other suitable manner, such as one or more Integrated Circuits (ICs), as a processor with embedded processor instructions or configured to access processor instructions stored in memory, as hardware with embedded firmware, a printed circuit board with various hardware components, or any combination thereof. Here, radar-based detection component 104 includes radar-emitting element 210, antenna(s) 212, digital signal processing component 214, and machine-learning component 216 which can be used in concert to wirelessly detect target objects using radar techniques.

Generally, radar-emitting element 210 is configured to provide a radar field. In some cases, the radar field is configured to at least partially reflect off a target object. The radar field can also be configured to penetrate fabric or other obstructions and reflect from human tissue. These fabrics or obstructions can include wood, glass, plastic, cotton, wool, nylon and similar fibers, and so forth, while reflecting from human tissues, such as a person's hand.

A radar field can be a small size, such as 0 or 1 millimeters to 1.5 meters, or an intermediate size, such as 1 to 30 meters. These sizes are merely for discussion purposes, and that any other suitable range can be used. When the radar field has an intermediate size, radar-based detection component 104 can be configured to receive and process reflections of the radar field to provide large-body gestures based on reflections from human tissue caused by body, arm, or leg movements, although other movements can also be recognized as well. In other cases, the radar field can be configured to enable radar-based detection component 104 to detect smaller and more-precise gestures, such as micro-gestures. Example intermediate-sized radar fields include those in which a user makes gestures to control a television from a couch, change a song or volume from a stereo across a room, turn off an oven or oven timer (a near field would also be useful here), turn lights on or off in a room, and so forth. Radar-emitting element 210 can be configured to emit continuously modulated radiation, ultra-wideband radiation, or sub-millimeter-frequency radiation.

Antennas 212 transmit and receive RF signals. In some cases, radar-emitting element 210 couples with antennas 212 to transmit a radar field. As one skilled in the art will appreciate, this is achieved by converting electrical signals into electromagnetic waves for transmission, and vice versa for reception. Radar-based detection component 104 can include any suitable number of antennas in any suitable configuration. For instance, any of the antennas can be configured as a dipole antenna, a parabolic antenna, a helical antenna, a monopole antenna, and so forth. In some embodiments, antennas 212 are constructed on-chip (e.g., as part of an SoC), while in other embodiments, antennas 212 are separate components, metal, hardware, etc. that attach to, or are included within, radar-based detection component 104. An antenna can be single-purpose (e.g., a first antenna directed towards transmitting signals, a second antenna directed towards receiving signals, and so forth), or multi-purpose (e.g., an antenna is directed towards transmitting and receiving signals). Thus, some embodiments utilize varying combinations of antennas, such as an embodiment that utilizes two single-purpose antennas directed towards transmission in combination with four single-purpose antennas directed towards reception.

The placement, size, and/or shape of antennas 212 can be chosen to enhance a specific transmission pattern or diversity scheme, such as a pattern or scheme designed to capture information about a micro-gesture performed by the hand. In some cases, the antennas can be physically separated from one another by a distance that allows radar-based detection component 104 to collectively transmit and receive signals directed to a target object over different channels, different radio frequencies, and different distances. In some cases, antennas 212 are spatially distributed to support triangulation techniques, while in others the antennas are collocated to support beamforming techniques. While not illustrated, each antenna can correspond to a respective transceiver path that physically routes and manages the outgoing signals for transmission and the incoming signals for capture and analysis.

Digital signal processing component 214 generally represents digitally capturing and processing a signal. For instance, digital signal processing component 214 samples analog RF signals received by antennas 212 to generate digital samples that represents the RF signals, and then processes these samples to extract information about the target object. Alternately or additionally, digital signal processing component 214 controls the configuration of signals generated and transmitted by radar-emitting element 210 and/or antennas 212, such as configuring a plurality of signals to form a specific diversity scheme like a beamforming diversity scheme. In some cases, digital signal processing component 214 receives input configuration parameters that control an RF signal's transmission parameters (e.g., frequency channel, power level, and so forth), such as through gesture sensor APIs 208. In turn, digital signal processing component 214 modifies the RF signal based upon the input configuration parameter. At times, the signal processing functions of digital signal processing component 214 are included in a library of signal processing functions or algorithms that are also accessible and/or configurable via gesture sensor APIs 208. Thus, digital signal processing component 214 can be programmed or configured via gesture sensor APIs 208 (and a corresponding programmatic interface of radar-based detection component 104) to dynamically select algorithms and/or dynamically reconfigure. Digital signal processing component 214 can be implemented in hardware, software, firmware, or any combination thereof.

Among other things, machine-learning component 216 receives information processed or extracted by digital signal processing component 214, and uses that information to classify or recognize various aspects of the target object, such as position, location, shape, presence, etc. In some cases, machine-learning component 216 applies one or more algorithms to probabilistically determine which gesture has occurred given an input signal and previously learned gesture features. As in the case of digital signal processing component 214, machine-learning component 216 can include a library of multiple machine-learning algorithms, such as a Random Forest algorithm, deep learning algorithms (e.g., artificial neural network algorithms, convolutional neural net algorithms, and so forth), clustering algorithms, Bayesian algorithms, and so forth. In turn, machine-learning component 216 uses the input data to learn what features can be attributed to a specific gesture. These features are then used to identify when the specific gesture occurs. In some embodiments, gesture sensor APIs 208 can be used to configure machine-learning component 216 and/or its corresponding algorithms. Thus, machine-learning component 216 can be configured via gesture sensor APIs 208 (and a corresponding programmatic interface of radar-based detection component 104) to dynamically select algorithms.

Having described computing device 102 in accordance with one or more embodiments, now consider a discussion of RF signal propagation in radar-based detection devices in accordance with one or more embodiments.

RF Signal Propagation in Radar-Based Detection Devices

As technology advances, users have an expectation that new devices will provide additional freedoms and flexibility over past devices. One such example is the inclusion of wireless capabilities in a device. Consider the case of a wireless mouse input device. A wireless mouse input device receives input from a user in the format of button clicks and movement in position, and wirelessly transmits this information to a corresponding computing device. The wireless nature obviates the need to have a wired connection between the wireless mouse input device and the computing device, which gives more freedom to the user with the mobility and placement of the mouse. However, the user still physically interacts with the wireless mouse input device as a way to enter input into the computing device. Accordingly, if the wireless mouse input device gets lost or is misplaced, the user is unable to enter input with that mechanism. Thus, removing the need for a peripheral device as an input mechanism gives additional freedom to the user. One such example is performing input to a computing device via a hand gesture.

Hand gestures provide a user with a simple and readily available mechanism to input commands to a computing device. However, detecting hand gestures can pose certain problems. For example, attaching a movement sensing device to a hand does not remove a user's dependency upon a peripheral device. Instead, it is a solution that trades one input peripheral for another. As an alternative, cameras can capture images, which can then be compared and analyzed to identify the hand gestures. However, this option may not yield a fine enough resolution to detect micro-gestures. An alternate solution involves usage of radar systems to transmit a radar field to a target object, and determine information about that target based upon an analysis of the reflected signal.

Figure 3:
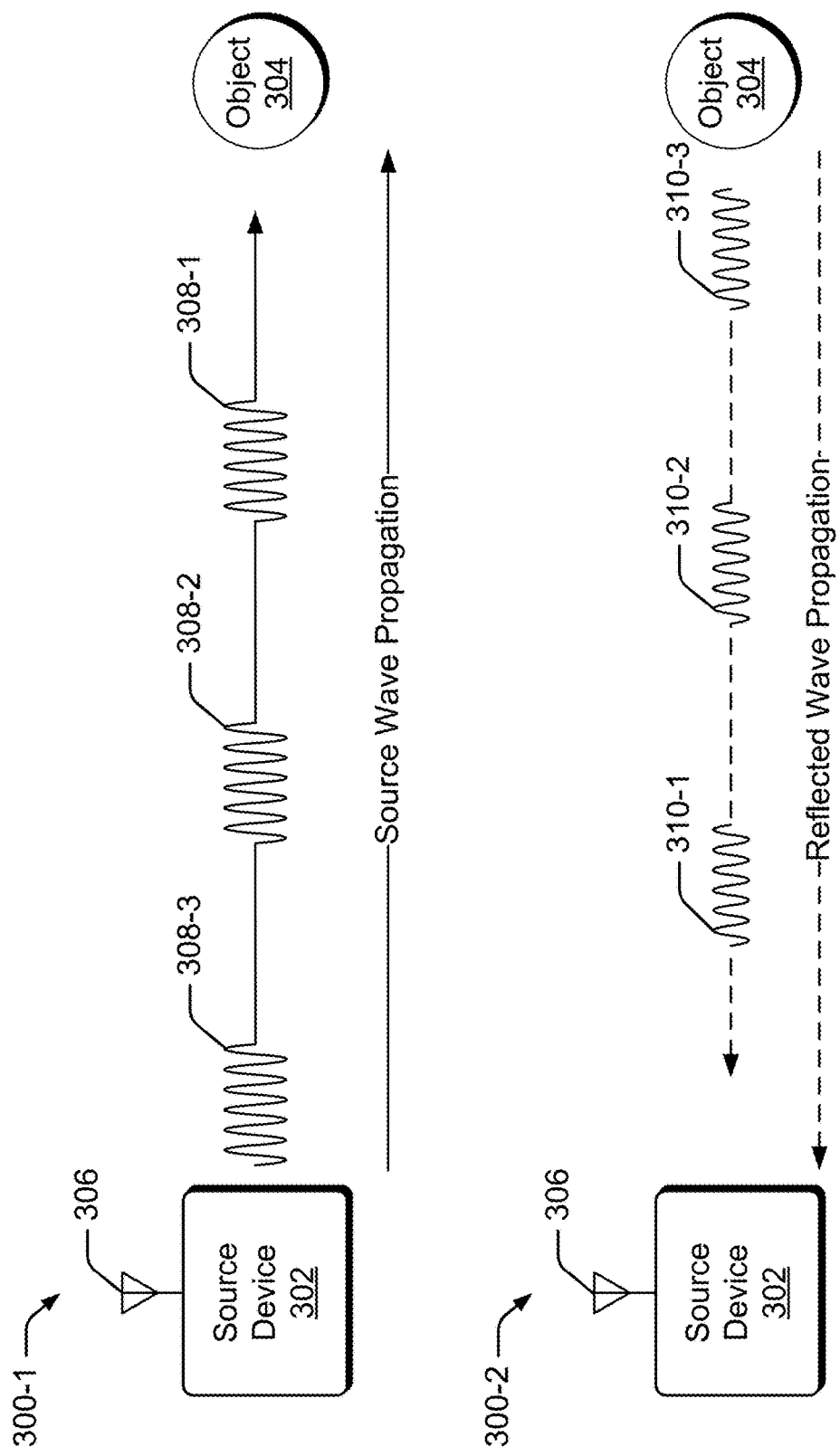
FIG. 3 illustrates an example of general signal properties.

Consider FIG. 3 which illustrates a simple example of RF wave propagation, and a corresponding reflected wave propagation. It is to be appreciated that the following discussion has been simplified, and is not intended to describe all technical aspects of RF wave propagation, reflected wave propagation, or detection techniques.

Environment 300-1 includes source device 302 and object 304. Source device 302 includes antenna 306, which generally represents functionality configured to transmit and receive electromagnetic waves in the form of an RF signal. It is to be appreciated that antenna 306 can be coupled to a feed source, such as a radar-emitting element, to achieve transmission of a signal. In this example, source device 302 transmits a series of RF pulses, illustrated here as RF pulse 308-1, RF pulse 308-2, and RF pulse 308-3. As indicated by their ordering and distance from source device 302, RF pulse 308-1 is transmitted first in time, followed by RF pulse 308-2, and then RF pulse 308-3. For discussion purposes, these RF pulses have the same pulse width, power level, and transmission periodicity between pulses, but any other suitable type of signal with alternate configurations can be transmitted without departing from the scope of the claimed subject matter.

Generally speaking, electromagnetic waves can be characterized by the frequency or wavelength of their corresponding oscillations. Being a form of electromagnetic radiation, RF signals adhere to various wave and particle properties, such as reflection. When an RF signal reaches an object, it will undergo some form of transition. Specifically, there will be some reflection off the object. Environment 300-2 illustrates the reflection of RF pulse 308-1, RF pulse 308-2, and RF pulse 308-3 reflecting off of object 304, where RF pulse 310-1 corresponds to a reflection originating from RF pulse 308-1 reflecting off of object 304, RF pulse 310-2 corresponds to a reflection originating from RF pulse 308-2, and so forth. In this simple case, source device 302 and object 304 are stationary, and RF pulse 308-1, RF pulse 308-2, and RF pulse 308-3 are transmitted via a single antenna (antenna 306) over a same RF channel, and are transmitted directly towards object 304 with a perpendicular impact angle. Similarly, RF pulse 310-1, RF pulse 310-2, and RF pulse 310-3 are shown as reflecting directly back to source device 302, rather than with some angular deviation. However, as one skilled in the art will appreciate, these signals can alternately be transmitted or reflected with variations in their transmission and reflection directions based upon the configuration of source device 302, object 304, transmission parameters, variations in real-world factors, and so forth. Upon receiving and capturing, RF pulse 310-1, RF pulse 310-2, and RF pulse 310-3, source device 302 can then analyze the pulses, either individually or in combination, to identify characteristics related to object 304. For example, source device 302 can analyze all of the received RF pulses to obtain temporal information and/or spatial information about object 304. Accordingly, source device 302 can use knowledge about a transmission signal's configuration (such as pulse widths, spacing between pulses, pulse power levels, phase relationships, and so forth), and further analyze a reflected RF pulse to identify various characteristics about object 304, such as size, shape, movement speed, movement direction, surface smoothness, material composition, and so forth.

Figure 4:
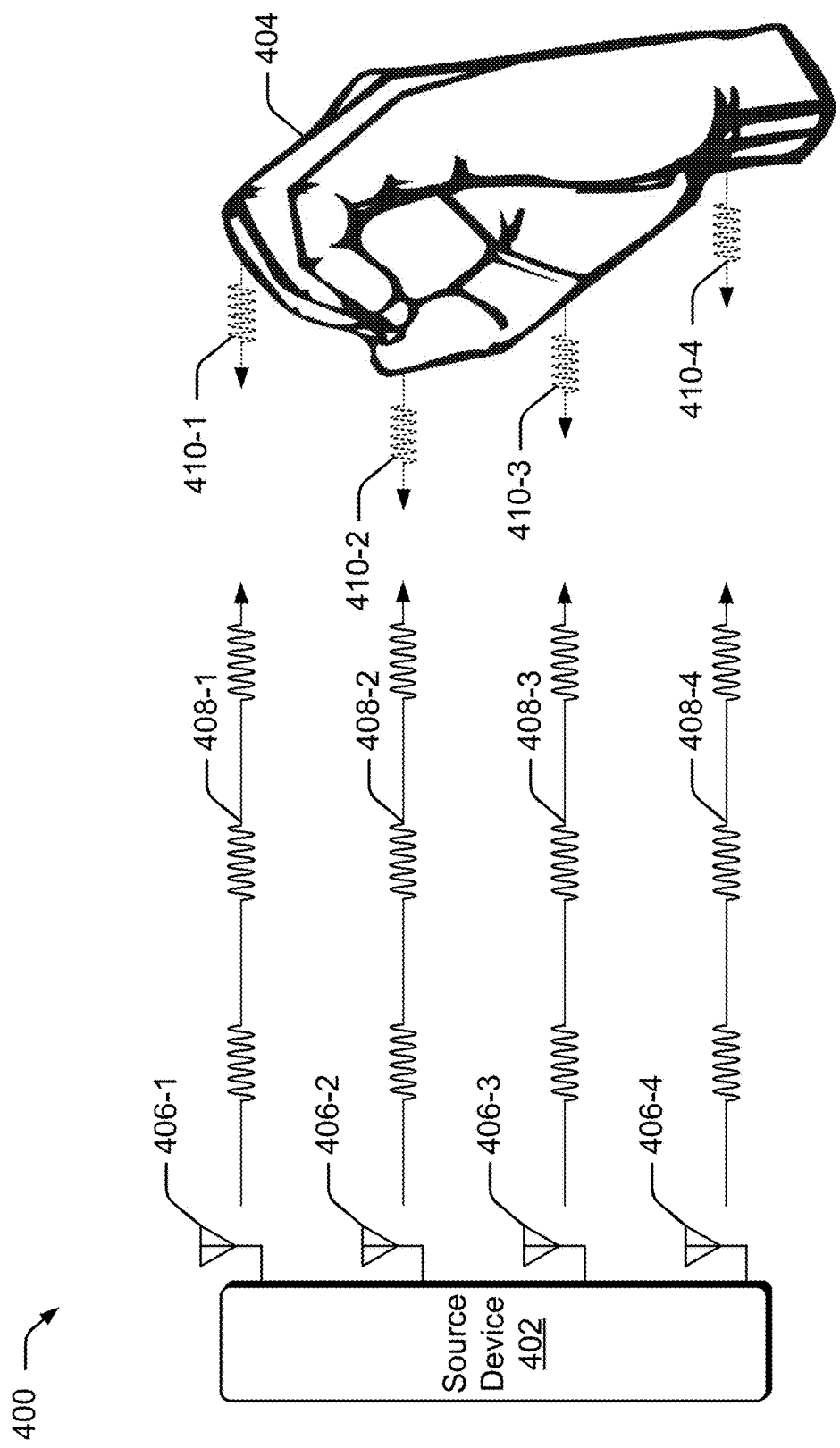
FIG. 4 illustrates another example of general signal properties.

Now consider FIG. 4, which builds upon the discussion of FIG. 3. FIG. 4 illustrates example environment 400 in which multiple antenna are used to ascertain information about a target object. Environment 400 includes source device 402 and a target object, shown here as hand 404. Generally speaking, source device 402 includes antenna 406-1, antenna 406-2, antenna 406-3, and antenna 406-4 to transmit and receive multiple RF signals. In some embodiments, source device 402 includes radar-based detection component 104 of FIG. 1 and FIG. 2, and antennas 406-1-406-4 correspond to antennas 212. While source device 402 in this example includes four antennas, it is to be appreciated that any suitable number of antennas can be used. Each antenna of antennas 406-1-406-4 is used by source device 402 to transmit a respective RF signal (e.g., antenna 406-1 transmits RF signal 408-1, antenna 406-2 transmits RF signal 408-2, and so forth). Further, these RF signals can be configured to form a specific transmission pattern or diversity scheme when transmitted together. For example, the configuration of RF signal 408-1, RF signal 408-2, RF signal 408-3, and RF signal 408-4, as well as the placement of antennas 406-1, antenna 406-2, antenna 406-3, and antenna 406-4 relative to a target object, can be based upon beamforming techniques to produce constructive interference or destructive interference patterns, or alternately configured to support triangulation techniques. At times, source device 402 configures RF signals 408-1-408-4 based upon an expected information extraction algorithm.

When RF signals 408-1-408-4 reach hand 404, they generate reflected RF signal 410-1, RF signal 410-2, RF signal 410-3, and RF signal 410-4. Similar to the discussion of FIG. 3, source device 402 captures these reflected RF signals, and then analyzes them to identify various properties or characteristics of hand 404, such as a micro-gesture. For instance, in this example, RF signals 408a-408d are illustrated with the bursts of the respective signals being transmitted synchronously in time. In turn, and based upon the shape and positioning of hand 404, reflected signals 410-1-410-4 return to source device 402 at different points in time (e.g., reflected signal 410-2 is received first, followed by reflected signal 410-3, then reflected signal 410-1, and then reflected signal 410-4). Reflected signals 410-1-410-4 can be received by source device 402 in any suitable manner. For example, antennas 406-1-406-4 can each receive all of reflected signals 410-1-410-4, or receive varying subset combinations of reflected signals 410-1-410-4 (e.g., antenna 406-1 receives reflected signal 410-1 and reflected signal 410-4, antenna 406-2 receives reflected signal 410-1, reflected signal 410-2, and reflected signal 410-3, and so forth). Thus, each antenna can receive reflected signals generated by transmissions from another antenna. By analyzing the various return times of each reflected signal, source device 402 can determine shape and corresponding distance information associated with hand 404. When reflected pulses are analyzed over time, source device 402 can additionally discern movement. Thus, by analyzing various properties of the reflected signals, as well as the transmitted signals, various information about hand 404 can be extracted, as further described below. It is to be appreciated that the discussion of this example with respect to radar detection has been simplified, and is not intended to be limiting.

As in the case of FIG. 3, FIG. 4 illustrates RF signals 408-1-408-4 as propagating at a 90° angle from source device 402 and in phase with one another. Similarly, reflected signals 410-1-410-4 each propagate back at a 90° angle from hand 404 and, as in the case of RF signals 408-1-408-4, are in phase with one another. However, as one skilled in the art will appreciate, more complex transmission signal configurations, and signal analysis on the reflected signals, can be utilized, examples of which are provided herein. In some embodiments, RF signals 408-1-408-4 can each be configured with different directional transmission angles, signal phases, power levels, modulation schemes, RF transmission channels, and so forth. These differences result in variations between reflected signals 410-1-410-4. In turn, these variations each provide different perspectives of the target object which can be combined using data fusion techniques to yield a better estimate of hand 404, how it is moving, its 3-dimensional (3D) spatial profile, a corresponding micro-gesture, etc.

Figure 5:
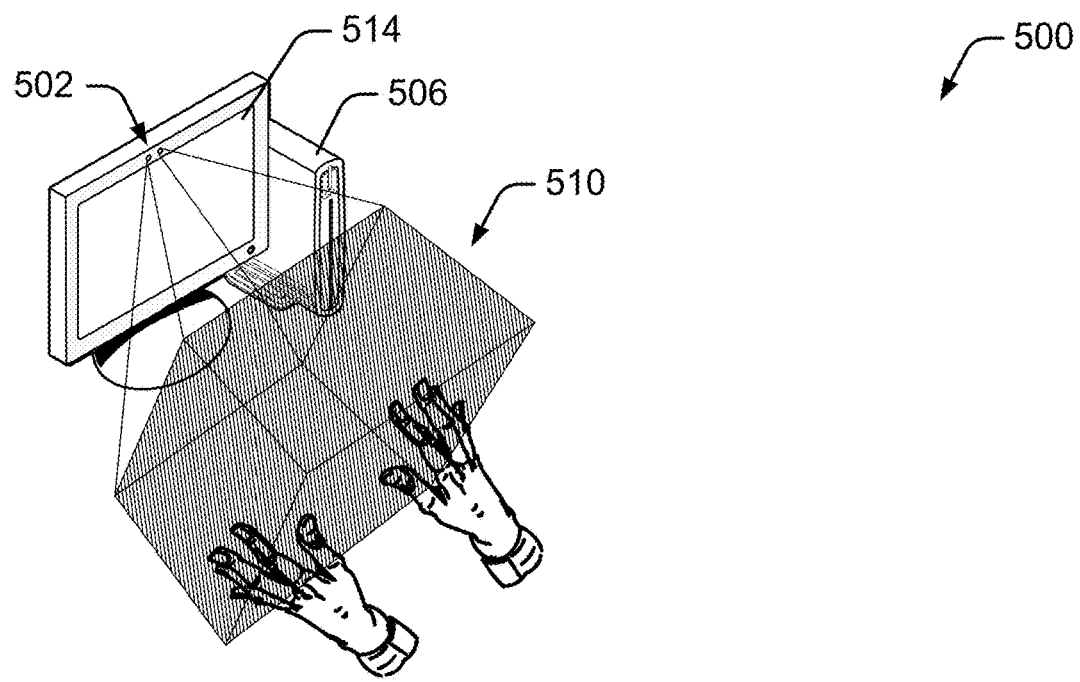
FIG. 5 illustrates an example environment that employs application-based signal processing parameters for radar-based detection in accordance with one or more embodiments.
Figure 5:
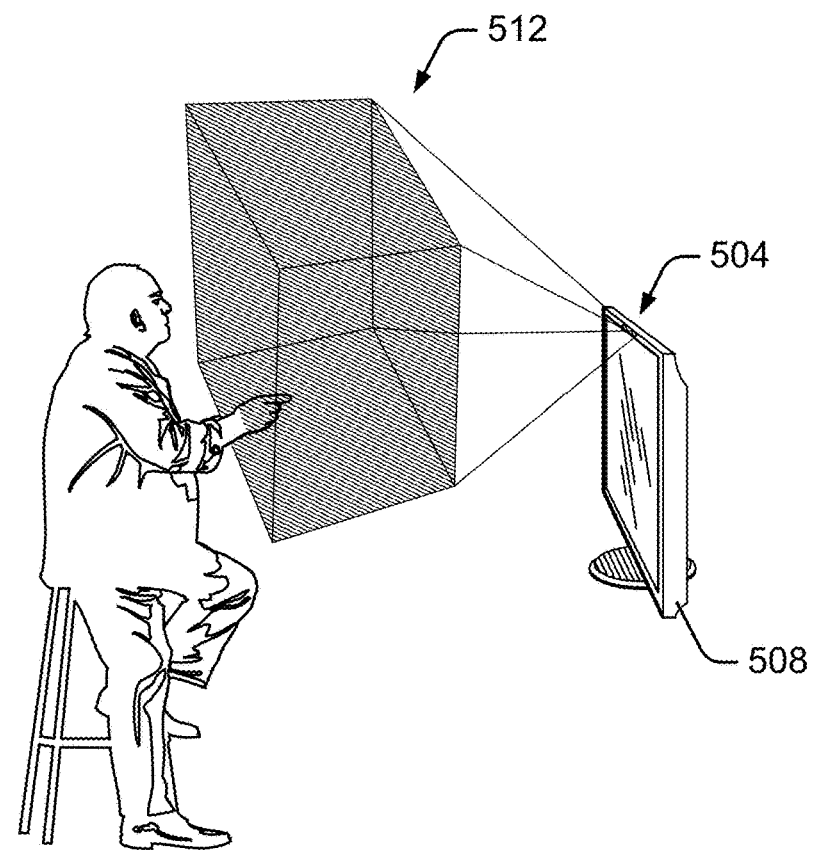

Now consider FIG. 5, which illustrates example environment 500 in which techniques using, and an apparatus including, a radar-based gesture recognition system may be embodied, such as radar-based detection component 104 of FIG. 1. Environment 500 includes two example devices using a radar-based detection system. In the first, radar-based detection system 502 provides a near radar field to interact with desktop computer 506, and in the second, radar-based detection system 504 provides an intermediate radar field (e.g., a room size) to interact with television 508. Radar-based detection system 502 and radar-based detection system 504 provide radar field 512 and intermediate radar field 512, respectively, and are described below.

Desktop computer 506 includes, or is associated with, radar-based detection system 502. These devices work together to improve user interaction with desktop computer 506. Assume, for example, that desktop computer 506 includes a touch screen 514 through which display and user interaction can be performed. This touch screen 514 can present some challenges to users, such as needing a person to sit in a particular orientation, such as upright and forward, to be able to touch the screen. Further, the size for selecting controls through touch screen 514 can make interaction difficult and time-consuming for some users. Consider, however, radar-based detection system 502, which provides near radar field 510 enabling a user's hands to interact with desktop computer 506, such as with small or large, simple or complex gestures, including those with one or two hands, and in three dimensions. As is readily apparent, a large volume through which a user may make selections can be substantially easier and provide a better experience over a flat surface, such as that of touch screen 514.

Similarly, consider radar-based detection system 504, which provides intermediate radar field 512. Providing a radar-field enables a user to interact with television 508 from a distance and through various gestures, ranging from hand gestures, to arm gestures, to full-body gestures. By so doing, user selections can be made simpler and easier than a flat surface (e.g., touch screen 514), a remote control (e.g., a gaming or television remote), and other conventional control mechanisms.

Radar-based gesture recognition systems can interact with applications or an operating system of computing devices, or remotely through a communication network by transmitting input responsive to recognizing gestures. Gestures can be mapped to various applications and devices, thereby enabling control of many devices and applications. Many complex and unique gestures can be recognized by radar-based gesture recognition systems, thereby permitting precise and/or single-gesture control, even for multiple applications. Radar-based gesture recognition systems, whether integrated with a computing device, having computing capabilities, or having few computing abilities, can each be used to interact with various devices and applications.

Figure 6:
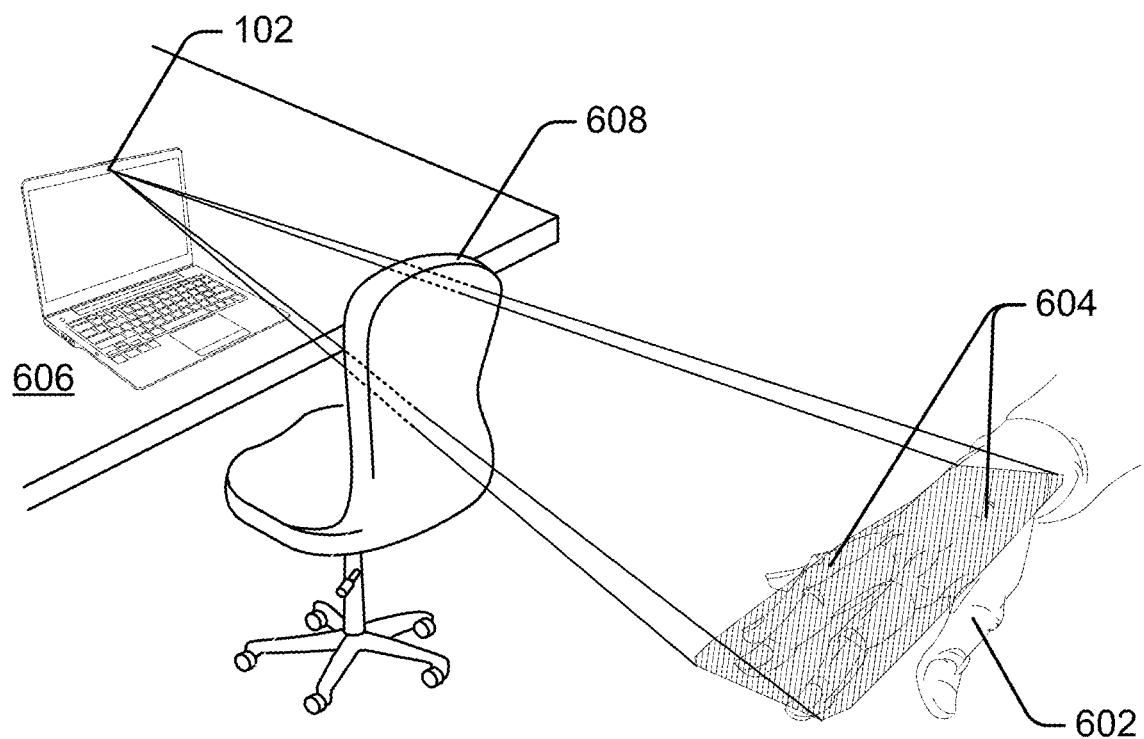
FIG. 6 illustrates an example environment that employs application-based signal processing parameters for radar-based detection in accordance with one or more embodiments.

The radar field can also include a surface applied to human tissue. This is illustrated at FIG. 6, which shows hand 602 having a surface radar field 604 provided by radar-based detection component 104 (of FIGS. 1 and 2) that is include in laptop 606. Radar-emitting element 210 (not shown) provides surface radar field 604 penetrating chair 608 and applied to hand 602. In this case, antennas 212 (not shown) is configured to receive a reflection caused by an interaction on the surface of hand 602 that penetrates (e.g., reflects back through) chair 608. Similarly, digital signal processing component 214 and/or machine-learning component 216 are configured to process the received reflection on the surface sufficient to provide gesture data usable to determine a gesture. Note that with surface radar field 604, another hand may interact to perform gestures, such as to tap on the surface on hand 602, thereby interacting with surface radar field 604. Example gestures include single and multi-finger swipe, spread, squeeze, non-linear movements, and so forth. Hand 602 may move or change shape to cause reflections, thereby also performing an occluded gesture.

With respect to human-tissue reflection, reflecting radar fields can process these fields to determine identifying indicia based on the human-tissue reflection, and confirm that the identifying indicia matches recorded identifying indicia for a person, such as authentication for a person permitted to control a corresponding computing device. These identifying indicia can include various biometric identifiers, such as a size, shape, ratio of sizes, cartilage structure, and bone structure for the person or a portion of the person, such as the person's hand. These identify indicia may also be associated with a device worn by the person permitted to control the mobile computing device, such as device having a unique or difficult-to-copy reflection (e.g., a wedding ring of 14 carat gold and three diamonds, which reflects radar in a particular manner). In addition, radar-based detection systems can be configured so that personally identifiable information is removed. For example, a user's identity may be treated so that no personally identifiable information can be determined for the user, or a user's geographic location may be generalized where location information is obtained (such as to a city, postal code, or state level), so that a particular location of a user cannot be determined. Thus, the user may have control over what information is collected about the user, how that information is used, and what information is provided to the user.

Having described general principles of RF signals which can be used in radar-based detection devices, now consider a discussion of application-based processing parameters for a radar-based detection system that can be employed in accordance with one or more embodiments.

Application-Based Processing Parameters

A radar-based detection system provides a user with a way to interact with a computing device without physically touching the computing device, or touching an input mechanism coupled to the computing device. As the user performs an in-the-air gesture, the radar-based detection system uses reflected signals to extract characteristics that are then used to identify and recognize the gesture. Similarly, the radar-based detection system can use reflected signals to characterize an environment in which a corresponding device resides. However, different applications sometimes have different needs. Further, a single application may have dynamic needs that change from one point in time to the next. Thus, a fixed radar-based detection system may have difficulty supporting these changing needs at a resolution desired by each respective application.

Various embodiments utilize application-based processing parameters to dynamically configure a radar-based detection system based upon an operating context of an associated device. A first application with execution priority on a device dynamically configures the radar-based detection system to emit a radar field suitable for a first operating context associated with the first application. The first application can also dynamically configure processing parameters of the radar-based detection system, such as digital signal processing parameters and machine-learning parameters. In some cases, a second application on the device assumes execution priority over the first application. When the second application assumes execution priority, it dynamically reconfigures the radar-based detection system to emit a radar field suitable to a second operating context associated with the second application. Alternately or additionally, the second application dynamically reconfigures the processing parameters of the radar-based detection system based upon the second operating context of the second application.

Figure 7:
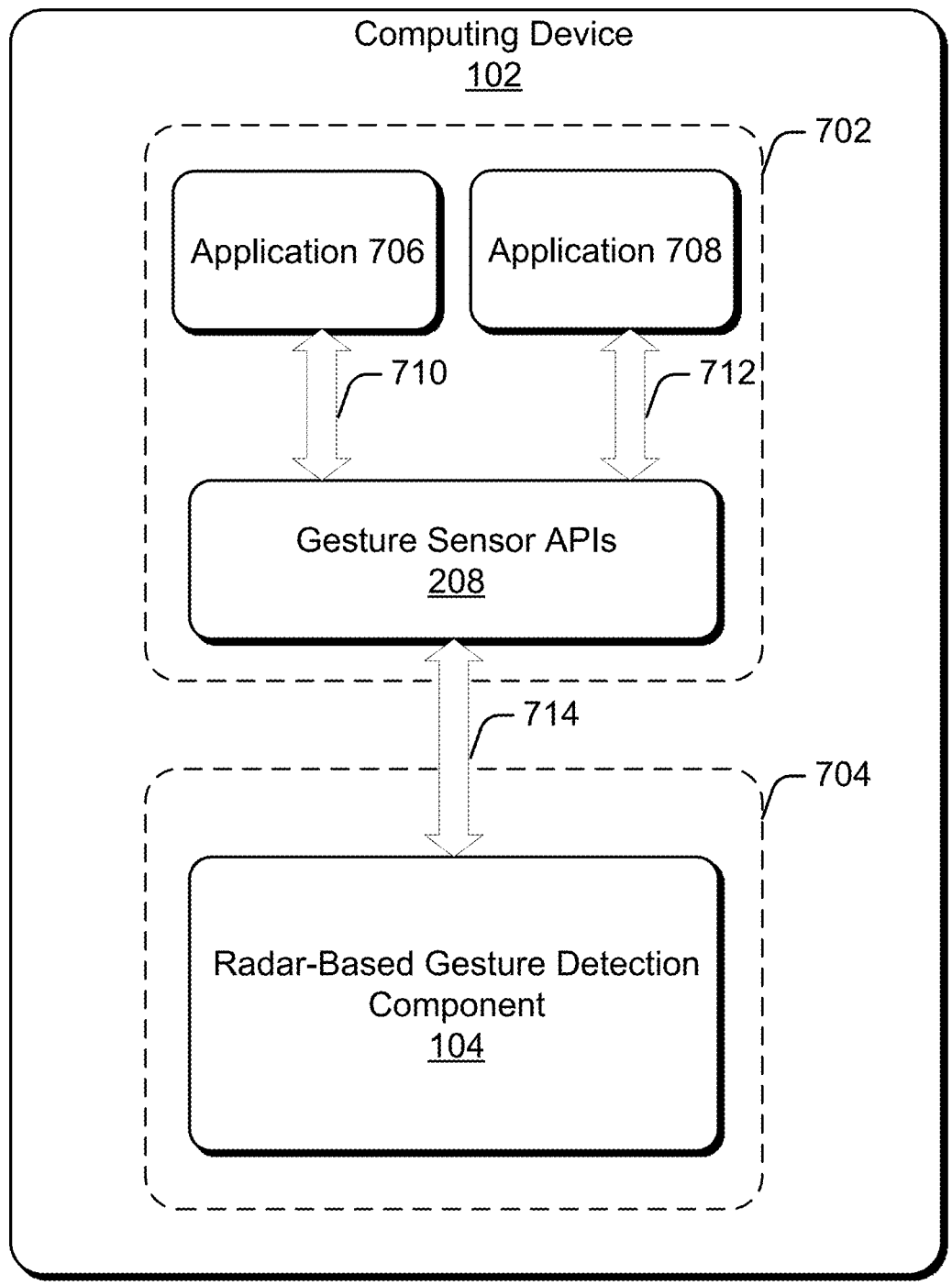
FIG. 7 illustrates an example device configured to dynamically configure a radar-based detection system in accordance with one or more embodiments.

FIG. 7 illustrates a detailed example of computing device 102 from FIG. 1. Here, computing device 102 has been generally partitioned into two sections: software partition 702 and hardware partition 704, each of which is outlined in a respective rectangle. For discussion purposes, components residing within software partition 702 can generally be considered software implementations, while components residing within hardware partition 704 can generally be considered hardware components. However, as one skilled in the art will appreciate, a software implementation may additionally include, or be embodied on, hardware, such as computer-readable storage media, to store processor-executable instructions and/or a processor which executes the processor executable instructions. Similarly, a hardware implementation may additionally include firmware. Thus, while components are described here in the context of being a software module or a hardware component, other embodiments implement these modules and/or components in varying combinations of hardware, software, firmware, and so forth. In this example, software partition 702 includes application 706 and application 708, as well as gesture sensor APIs 208 from FIG. 2. Conversely, hardware partition 704 includes radar-based detection component 104 from FIG. 1.

Application 706 and application 708 represent respective software functionality on computing device 102, such as, by way of example and not of limitation, an operating system, an email client, a home security or monitoring application, a web browser, a television remote control application, an image capture application, an audio playback application, an instant messaging application, a Voice-over-Internet Protocol (VoIP) application, a gaming application, a virtual-reality application, and so forth. At times, a user can directly interface with these applications by entering direct input, such as by performing an in-the-air gesture that is detected by radar-based detection component 104. Other times, the user indirectly interfaces with these applications. For example, radar-based detection component 104 may detect the presence of a user walking into a room, and forward this input to application 706 or application 708 as a way to wake or activate the application. Thus, the user can directly or indirectly enter input to an application. In order to send information to radar-based detection component 104, application 706, and application 708 each have a bidirectional communication path with gesture sensor APIs 208, indicated here as communication path 710 and communication path 712 respectively.

Communication path 710 and communication path 712 generally represent a data exchange path, and/or an ability for an application to communicate with, or invoke, a gesture sensor API. In some cases, an application can exchange data or invoke an API by including header files, linking to an associated library, and so forth, in order to establish a data exchange path and/or communication path with the API. Other times, an application utilizes a hardware interface, such as an Input/Output (TO) port, shared memory, hardware interrupt lines, and so forth. to establish a communication path. Here, communication path 710 and communication path 712 are bidirectional communication paths with gesture sensor APIs 208. Accordingly, an application can either send data to, or receive data from, these APIs. When application 706 has execution priority over application 708, application 706 calls or invokes gesture sensor APIs 208 (via communication path 710) in order to configure processing parameters and/or a radar field configuration of radar-based detection component 104. Since communication path 710 is bidirectional, application 706 can also receive feedback from radar-based detection component 104 (via gesture sensor APIs 208). Similarly, application 708 uses communication path 712 to send data to, or receive data from, radar-based detection component 104 via the corresponding APIs.

Communication path 714 represents a bidirectional communication path between gesture sensor APIs 208 and radar-based detection component 104 that enables two-way data exchange. This communication path can be a suitable combination of programmatic interfaces, such as a hardware register with an address, shared memory, data I/O port, a Transmission Control Protocol over Internet Protocol (TCP-IP) communication path, etc. Thus, communication path 714 enables gesture sensor APIs 208 to exchange data with radar-based detection component 104. When positioned in combination with communication path 710 and/or communication path 712, application 706 and application 708 can dynamically modify a radar detection system.

To further illustrate, consider a pipeline implementation in which each stage of the pipeline receives an input, analyzes or processes the input, subsequently generates new information, and then passes the newly generated information to a next stage in the pipeline. Some embodiments enable an application to dynamically configure or modify states of a pipeline. For example, consider a case where radar-based detection component 104 use a pipeline that includes, among other things, a digital signal processing stage and a machine-learning stage (implemented, at least in part, by digital signal processing component 214 and machine-learning component 216 of FIG. 2, respectively). Applications can use the aforementioned communication paths and APIs to configure each of these stages either together in concert, or individually.

As previously discussed, gesture sensor APIs 208 can provide access to high-level commands that obscure hardware configuration information at an application level, to low-level commands that expose hardware level access and configurations at an application level. Thus, some embodiments provide a high-level command, such as a high-level "Default Configuration" command, that can be invoked by an application to configure radar-based detection component 104 with a default level configuration. Similarly, gesture sensor APIs 208 can include multiple high-level preset configuration APIs that can be used by an application to preset the radar-based detection component to a preset configuration without needing to send parameters (e.g., "Preset to Micro-Gesture detection", "Preset to Room-sized detection", "Preset to Near-Field Detection", "Preset to Facial Identification Detection", and so forth). Here, each preset configuration API automatically configures the radar-based detection component into a predetermined configuration for particular detection preferences (e.g., a predetermined radar field, a predetermined processing algorithm. and so forth.). In some cases, the preset configuration API sends a single command to the radar-based detection component to invoke predetermined parameters known internally to the radar-based detection component. In other cases, a preset configuration API sends multiple commands and/or parameters. Thus, preset configuration APIs can dynamically configure and send parameters to the radar-based detection component, or can simply send a command to use internal and/or predetermined settings. Any suitable configuration parameters can be dynamically set, such as a frame rate parameter, a Doppler coherent processing interval parameter, a pre-Doppler coherent processing interval parameter, a ramp slope parameter, a transmission power parameter, and so forth.

Mid-to-low-level access provided by gesture sensor APIs 208 enables an application to individually configure each stage of the pipeline with an algorithm or set individual hardware parameters. Accordingly, gesture sensor APIs 208 can provide programmatic access to input configuration parameters that configure transmit signals (e.g., signals 112 and/or signals 116 of FIG. 1) and/or select target object recognition algorithms, examples of which are provided herein. This can be an iterative process, where an application changes parameters for each respective iteration of a multi-iteration process, or change parameters based upon feedback received from the radar-bases gesture detection component.

As one example, consider a case where application 706 has execution priority, and is in control of the configuration of radar-based detection component 104. In some embodiments, application 706 configures the radar-based detection component to transmit a first frequency suitable to sense when a person walks into a room and/or sense presence. At a later point in time, application 706 receives feedback from radar-based gesture component indicating that a presence has been detected (e.g., a user has entered a room). In response to this, application 706 changes the frequency emitted by radar-based detection component 104 to a higher frequency relative to the first configuration suitable to obtaining more resolution and information about the presence, such as heart beat detection, facial recognition and/or user identity, a micro-gesture, and so forth. In this instance, application 706 configures the radar detection system with a starting or default frequency for beginning a detection process, then dynamically changes the frequency parameter at a later point in time upon receiving feedback from the radar detection system. Thus, depending upon an operating context or the desired information, an application can dynamically adjust a transmitted frequency to detect and distinguish between smaller objects close together by using a higher frequency transmission, and additionally adjust the transmitted frequency to detect larger objects by dynamically adjusting the transmitted frequency to a lower frequency.

As another example, consider dynamic adjustment of a frame rate. At times, the frame rate determines a maximum velocity that can be sensed by the radar-based detection system. A proportional relationship exists between increasing a frame rate and the maximum velocity detection, in that increasing the frame rate of a signal yields a higher velocity detection resolution for detecting the velocity of an object. However, adjusting the frame rate also impacts a signal-to-noise (SNR) ratio over the duration of a data capture and/or "sensing time interval" (e.g., a window in time over which target object detection occurs), such that there is an inverse relationship. In other words, an increased frame yields a lower SNR which, in turn, can adversely impact the accuracy of a detection process. Thus, there may be times when an application initially configures a radar detection system with a high SNR and low velocity detection resolution for an initial object detection process, but then alters the frame rate dynamically to have a higher velocity detection resolution than previously used with the initial detection in order to discern faster sub-movements, such as finger movement associated with a micro-gesture. In other cases, the frame rate can be adjusted to an expected velocity range, such as a frame rate that can discern the difference between a human gait (slower) versus an animal gait (faster). By tailoring or configuring the frame rate for a specific velocity range, the radar-based detection system can identify when a person enters a room, and ignore when a dog enters the room based upon differences in respective gaits. Accordingly, some embodiment enable dynamic modification of a frame rate associated with a radar-based detection system.

Other dynamic adjustments can be applied to configure various features of the radar system, such as range resolution. Range resolution impacts how well the radar system can distinguish between multiple targets that have a same bearing but located at different ranges. Some embodiments dynamically adjust parameters, such as beginning and ending transmission frequencies, ramp slope, and so forth, to affect a corresponding bandwidth which, in turn affects the range resolution of a radar-based detection system. Larger bandwidths enable detection of smaller objects (such as a micro-gesture), while smaller bandwidths are more suitable for larger object detection (such as a person entering a room). Thus, for an iterative process with feedback, an application may pick an intermediate bandwidth (through ramp slope adjustments) for initial object detection and, upon receiving feedback from the radar system, adjust the radar-based detection system to detect small or large objects based upon its operating context. Phase placement can also be dynamically adjusted by an application that desires to make radar detection more tailored or specific to a particular (expected) target.

With regards to velocity, a Doppler coherent processing interval determines or influences a velocity detection resolution. For instance, a Doppler coherent processing interval can be used to determine a number of transmissions and/or data acquisitions that are combined coherently to determine a velocity associated with a target object. In turn, the Doppler coherent processing interval can affect how well a radar detection system can discern between multiple objects that are moving in speed relative to another, and whether a radar detection system is able to identify each object separately, or instead views the multiple objects as one. Accordingly, some embodiments enable an application to dynamically reconfigure a velocity detection resolution of a radar-based detection system by allowing dynamic modifications to a Doppler coherent processing interval parameter.

Figure 8:
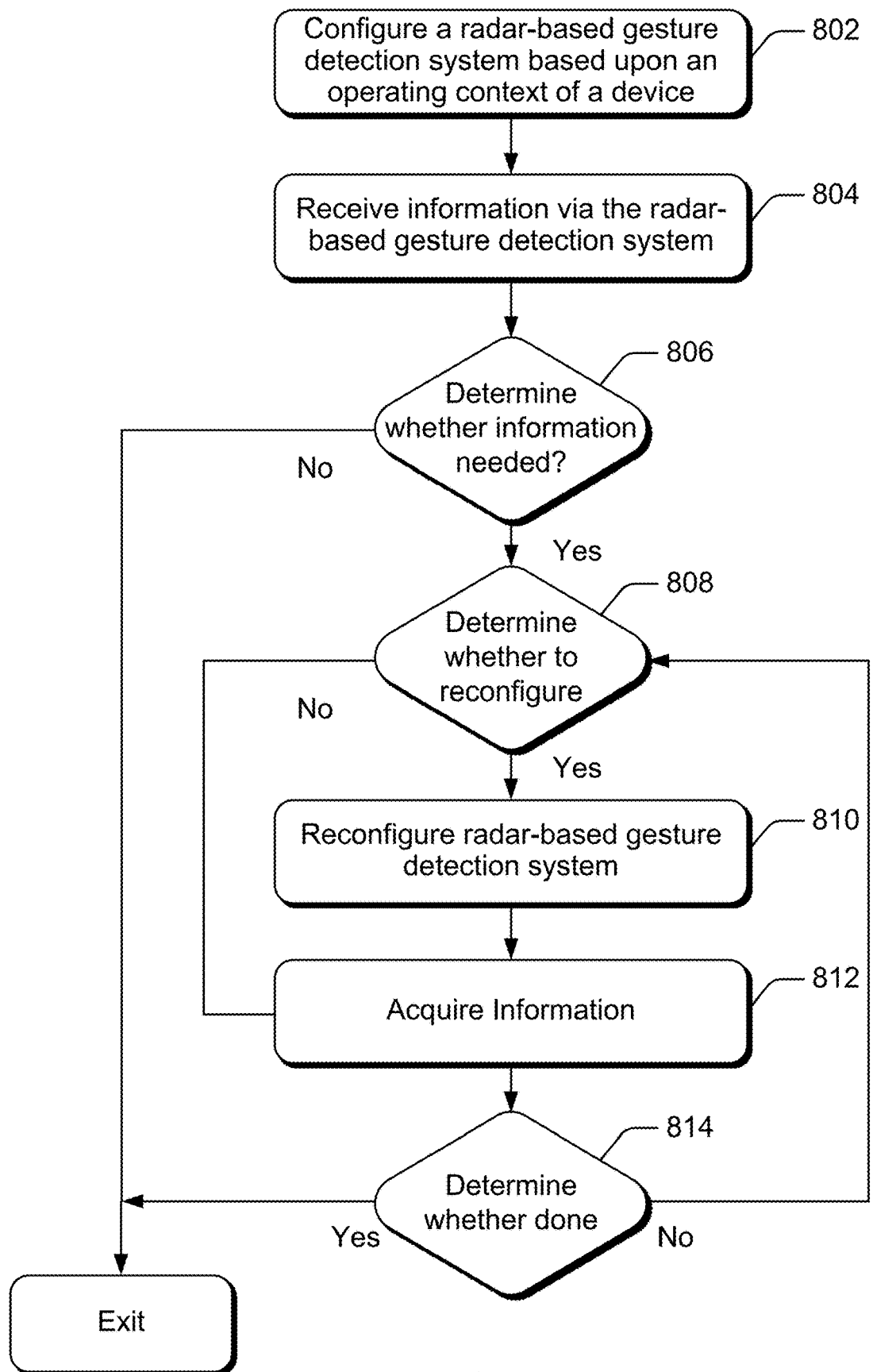
FIG. 8 illustrates an example flow diagram in accordance with one or more embodiments.

FIG. 8 is a flow diagram that describes steps in a method for application-based signal processing adjustment of a radar-based detection system in accordance with one or more embodiments. The method can be implemented in connection with any suitable hardware, software, firmware, or combination thereof. In at least some embodiments, the method can be implemented by a suitably-configured system, such radar-based detection component 104, applications 206, and/or gesture sensor APIs 208 of FIGS. 1 and 2.

Step 802 configures a radar-based detection system based upon an operating context of a device. For example, a device that includes multiple applications can have different operating contexts depending upon which application is active and/or has control over the radar-based detection system. In some embodiments, an application running on the device dynamically configures the radar-based detection system using a software interface that is coupled to a hardware programmatic interface, such as gesture sensor APIs 208 of FIG. 2. The configuration can be selected in any suitable manner. For example, an application sometimes configures the radar-based detection system using a default configuration, or a preset configuration associated with what type of input the application expects. Other times, an application queries the system to determine whether a current configuration of the radar-based detection system is currently in a state suitable for the needs of the application. As another example, an application can configure the radar-based detection system to detect a target object, action, or gesture specific to the application.

Upon configuring the radar-based detection system, the application receives information in step 804. In some embodiments, the application receives notification of an event, such as the detection of a gesture, the presence of a user, the occurrence of a timeout, etc. Other times, the application receives more detailed information, such as size and/or shape information associated with a target object, a type of gesture detected, velocity information associated with a target object, user identifying information, and so forth.

Step 806 determines whether more information is needed. As one example, some embodiments include an application that uses multiple iterations to obtain additional detail on a target object at each iteration. If all iterations have been performed, or the information has been captured adequately, step 806 may determine that no more information is needed. If no information is needed, and/or the predetermined number of iterations has completed, the process transitions to completion, illustrated here as "Exit". However, if the information capture process has failed, not all of the iterations have been performed, or a different context needs different information, step 806 determines that more information gathering or data capture is needed, and the process proceeds to step 808.

Step 808 determines whether to reconfigure the radar-based detection system. In some cases, the application or device queries the radar-based detection system to obtain a current state, and then compares the current state to a state that represents the needs of the application. If the current state suffices, step 808 determines that no reconfiguration is needed and proceeds to step 812 to acquire information. If the current state does not suffice, and/or lacks the resolution to extract the desired information, step 808 determines to reconfigure the radar-based detection system, and proceeds to step 810.

Step 810 reconfigures the radar-based detection system. This can include reconfiguring the radar field that is emitted by the radar-based detection system, reconfiguring a digital signal processing stage and/or algorithms, reconfiguring a machine-learning stage and/or algorithms, a type of information extracted, a resolution on detecting a target object, and so forth. As described with respect to step 802, some embodiments utilize a software interface that is coupled to a hardware (programmatic) interface (e.g., gesture sensor APIs 208 of FIG. 2).

Step 812 acquires additional information. The additional information can be based upon a reconfigured radar-based detection system, such as that performed in step 810, or can be based upon a previously used configuration. The additional information can be a same type of information as that received in step 804, or can be alternate information. As one example, step 804 can be used to obtain location information about a person's face, while step 812 can be used to obtain information about a person's identify from a more detailed analysis of the face. Other times, information generated or received in step 804 can be averaged or combined together with information generated or received in step 812. Alternately or additionally, the additional information can be feedback information from the radar-based detection system.

Step 814 determines whether all information has been acquired, and/or whether the process is done. If step 814 determines that all information has been acquired, the process proceeds to "Exit", as in the case of step 806. However, if more information is needed, the process returns to step 808 to determine whether to reconfigure the radar-based detection system, at which point step 810, step 812, and step 814 repeat as needed (e.g., information has been gathered to completion, iterations have been completed, a failure mode has been detected, and so forth).

Figure 9:
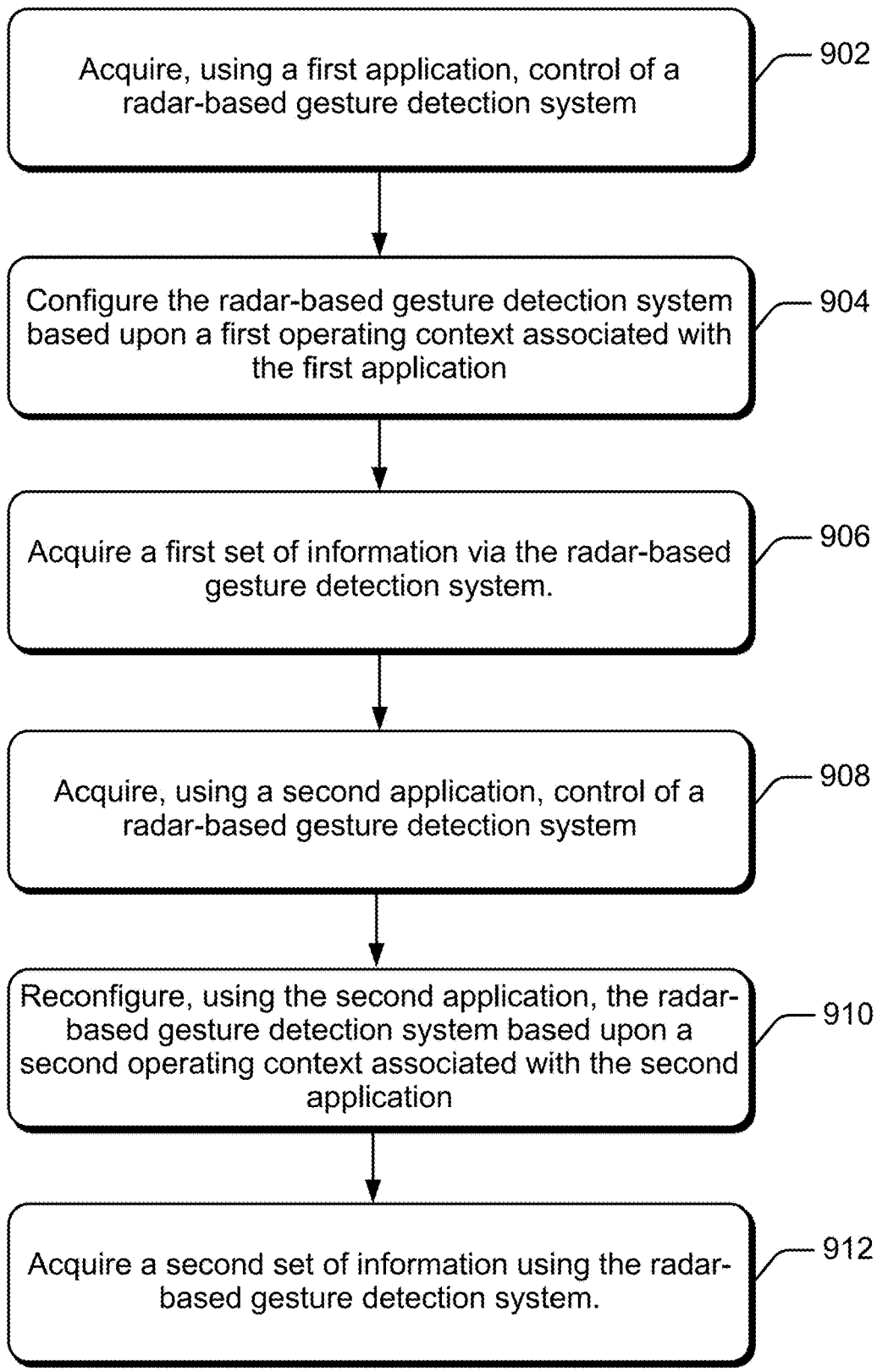
FIG. 9 illustrates an example flow diagram in accordance with one or more embodiments.

FIG. 8 describes an iterative process in which an application dynamically modifies the radar-based detection system based upon a changing operating context of an application. In other embodiments, the dynamic modifications can occur between applications. Consider now FIG. 9, which illustrates a flow diagram that describes steps in a method for application-based signal processing adjustment of a radar-based detection system in accordance with one or more embodiments. The method can be implemented in connection with any suitable hardware, software, firmware, or combination thereof. In at least some embodiments, the method can be implemented by a suitably-configured system, such as radar-based detection component 104, applications 206, and/or gesture sensor APIs 208 of FIGS. 1 and 2.

Step 902 acquires control of a radar-based detection system using a first application. The application may obtain a semaphore lock in software to acquire and retain control of the radar-based detection system, but other techniques can be used, such as mutex protection, spinlocks, atomic instructions, and so forth. Here, the term "control" is used to indicate that the first application has the rights or priority to modify the radar-based detection system over other applications. In other cases, control is managed internal to other software, such as gesture sensor API's 208. For example, gesture sensor API's 208 can maintain a queue of configuration requests, and implement a handshaking protocol to manage when the radar-based detection system can be reconfigured.

Step 904 configures the radar-based detection system based upon a first operating context associated with the first application. Responsive to configuring the radar-based detection system, step 906 receives a first set of information via the radar-based detection system. In some embodiments, step 904 and step 906 can be implemented as an iterative loop that incorporates feedback from the radar-based detection component, such as the iterative loop described with respect to FIG. 8. Other embodiments use a single pass, rather than an iterative loop.

At a later and arbitrary point in time, step 908 acquires control of the radar-based detection system using a second application. Similar to that described with the first application, control of the radar-based detection system can be acquired directly by the second application, indirectly through APIs, and so forth. Upon acquiring control of the radar-based detection system using the second application, step 910 reconfigures the radar-based detection system based upon an operating context associated with the second application, such as by reconfiguring an emitted radar field, digital signal processing algorithms, and so forth. Upon reconfiguring the radar-based detection system, step 912 acquires a second set of information using the radar-based detection system. As in the case of step 904 and step 906, step 910 and step 912 can be implemented as an iterative loop that incorporates feedback from the radar-based detection component, or use a single pass.

Adaptive and dynamic reconfiguration of a radar-based detection system allows a system to iteratively refine the detecting process, as well as tailor a radar-based detection system to different applications and uses. In turn, this allows different applications on a same device to use the radar-based detection system in different ways. Thus, a same radar-based detection system can be first configured to optimally detect large movements, such arm waves or a walking gait, then reconfigured to next optimally detect a micro-gesture performed by a hand, tongue, eye (blinking), or an eyebrow (raising and lowering), As one skilled in the art will appreciated, the detection of these different types of gestures (e.g., large gestures versus small gestures) may use varying algorithms, radar fields, and so forth to optimally detect or extract the desired information. Consider the example of a fixed system that is optimally configured to detect a micro-gesture. Such a fixed system may miss or have faulty detection for large gestures. Dynamic reconfiguration of a radar system allows an application to optimally configure the detection process based upon its operating context or needs, and allows for multiple applications with differing needs to reuse a same set of hardware.

Having considered various embodiments, consider now an example system and device that can be utilized to implement the embodiments described herein.

Example Electronic Device

Figure 10:
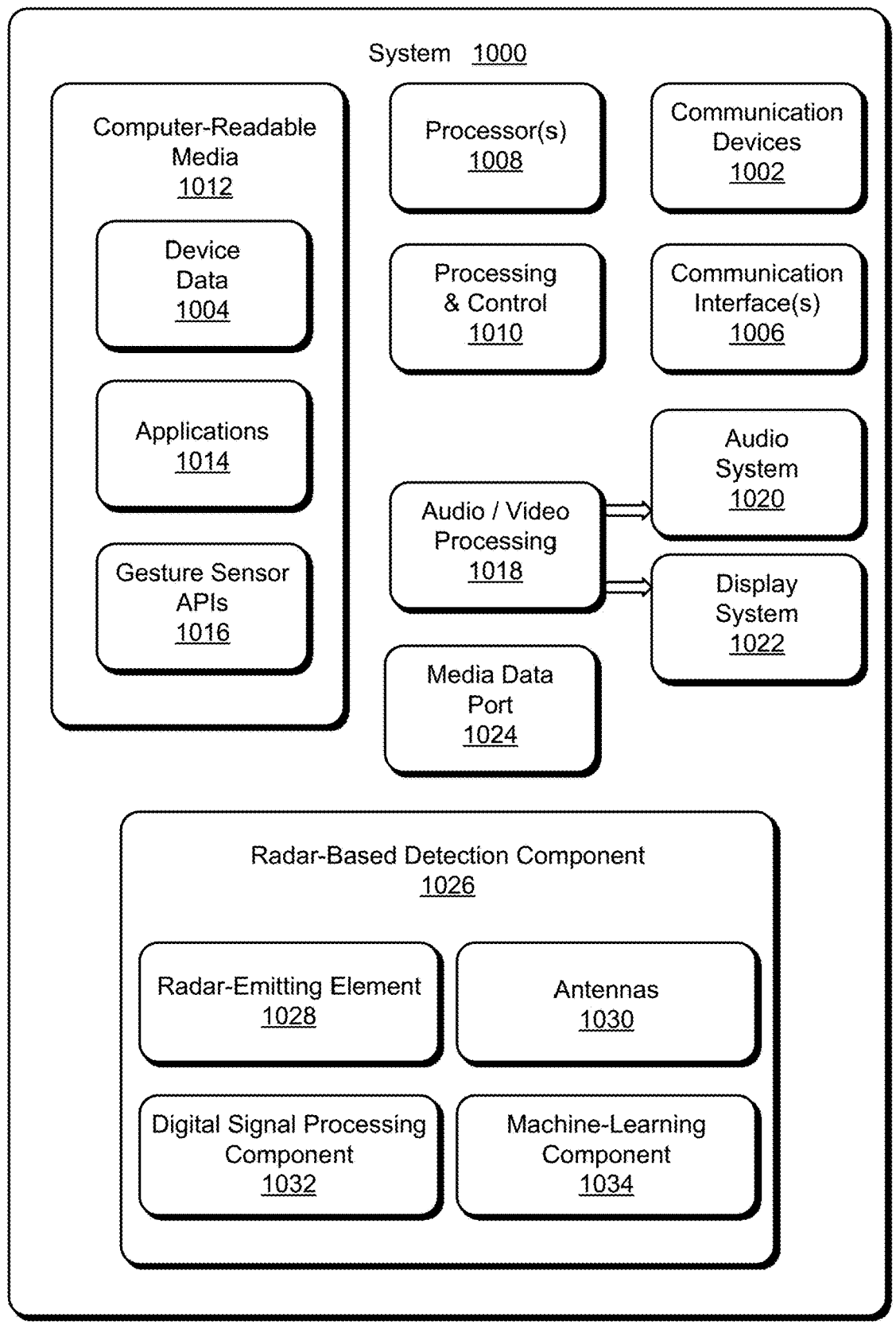
FIG. 10 illustrates an example device in which application-based signal processing parameters can be employed in accordance with one or more embodiments.

FIG. 10 illustrates various components of an example system 1000 that incorporates dynamically modifying a radar-based detection system as described with reference to FIGS. 1-9. System 1000 may be implemented as any type of a fixed or mobile device, in any form of a consumer, computer, portable, user, communication, phone, navigation, gaming, audio, camera, messaging, media playback, and/or other type of electronic device, such as computing device 102 described with reference to FIGS. 1 and 2. In some cases, system 1000 can alternately be implemented as a printed circuit board (PCB), a chip-on-chip system, and so forth. In light of this, it is to be appreciated that various alternate embodiments can include additional components that are not described, or exclude components that are described, with respect to system 1000.

System 1000 includes communication devices 1002 that enable wired and/or wireless communication of device data 1004 (e.g., received data, data that is being received, data scheduled for broadcast, data packets of the data, and so forth). The device data 1004 or other device content can include configuration settings of the device and/or information associated with a user of the device.

System 1000 also includes communication interfaces 1006 that can be implemented as any one or more of a serial and/or parallel interface, a wireless interface, any type of network interface, a modem, and as any other type of communication interface. The communication interfaces 1006 provide a connection and/or communication links between system 1000 and a communication network by which other electronic, computing, and communication devices communicate data with system 1000.

System 1000 includes one or more processors 1008 (e.g., any of microprocessors, controllers, and the like) which process various computer-executable instructions to control the operation of system 1000 and to implement embodiments of the techniques described herein. Alternately or in addition, system 1000 can be implemented with any one or combination of hardware, firmware, or fixed logic circuitry that is implemented in connection with processing and control circuits which are generally identified at 1010. Although not shown, system 1000 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

System 1000 also includes computer-readable storage media 1012, such as one or more memory components, examples of which include random access memory (RAM), non-volatile memory (e.g., any one or more of a read-only memory (ROM), flash memory, EPROM, EEPROM, and so forth), and a disk storage device. A disk storage device may be implemented as any type of magnetic or optical storage device, such as a hard disk drive, a recordable and/or rewriteable compact disc (CD), any type of a digital versatile disc (DVD), and the like.

Computer-readable storage media 1012 provides data storage mechanisms to store and maintain the device data 1004, as well as storing and maintaining various applications, and any other types of information and/or data related to operational aspects of system 1000. Here, computer-readable storage media 1012 includes applications 1014, which generally represent applications with an ability to configure a radar-based gesture sensor component. Other applications can include a device manager (e.g., a control application, software application, signal processing and control module, code that is native to a particular device, a hardware abstraction layer for a particular device, and so forth). Computer-readable storage media 1012 also includes gesture sensor APIs 1016.

Gesture sensor APIs 1016 provide programmatic access to a gesture sensor component. The programmatic access can range from high-level programming access that obscures underlying hardware implementation details and/or how a function is implemented (e.g., no hardware configuration parameters or algorithmic parameters), to low-level programmatic access that enables an application to send low-level input configuration parameters associated with modifying how signals are transmitted, received, and/or processed by a gesture sensor component.

System 1000 also includes audio and/or video processing system 1018 that processes audio data and/or passes through the audio and video data to audio system 1020 and/or to display system 1022 (e.g., a screen of a smart phone or camera). Audio system 1020 and/or display system 1022 may include any devices that process, display, and/or otherwise render audio, video, display, and/or image data. Display data and audio signals can be communicated to an audio component and/or to a display component via an RF link, S-video link, HDMI, composite video link, component video link, DVI, analog audio connection, or other similar communication link, such as media data port 1024. In some implementations, audio system 1020 and/or display system 1022 are external components to system 1000. Alternately, or additionally, display system 1022 can be an integrated component of the example electronic device, such as part of an integrated touch interface.

System 1000 also includes radar-based detection component 1026 that wirelessly identifies one or more features of a target object, such as a micro-gesture performed by a hand, presence detection, facial recognition, etc. Radar-based detection component 1026 can be implemented as any suitable combination of hardware, software, firmware, and so forth. In some embodiments, radar-based detection component 1026 is implemented as an SoC. Among other things, radar-based detection component 1026 includes radar-emitting element 1028, antennas 1030, digital signal processing component 1032, and machine-learning component 1034.

Radar-emitting element 1028 is configured to provide a radar field. In some cases, the radar field is configured to at least partially reflect off a target object. The radar field can also be configured to penetrate fabric or other obstructions and reflect from human tissue. These fabrics or obstructions can include wood, glass, plastic, cotton, wool, nylon and similar fibers, and so forth, while reflecting from human tissues, such as a person's hand. Radar-emitting element 1028 works in concert with antennas 1030 to provide the radar field.

Antennas 1030 transmit and receive RF signals under the control of radar-based detection component 1026. Each respective antenna of antennas 1030 can correspond to a respective transceiver path internal to Radar-based detection component 1026 that physically routes and manages outgoing signals for transmission and the incoming signals for capture and analysis.

Digital signal processing component 1032 digitally processes RF signals received via antennas 1030 to extract information about the target object. In some embodiments, digital signal processing component 1032 additionally configures outgoing RF signals for transmission on antennas 1030. Some of the information extracted by digital signal processing component 1032 is used by machine-learning component 1034. Digital signal processing component 1032 at times includes multiple digital signal processing algorithms that can be selected or deselected for an analysis, examples of which are provided herein. Thus, digital signal processing component 1032 can generate key information from RF signals that can be used to determine what gesture might be occurring at any given moment. At times, an application, such as applications 1014, can configure the operating behavior of digital signal processing component 1032 via gesture Sensor APIs 1016.

Machine-learning component 1034 receives input data, such as a transformed raw signal or high-level information about a target object, and analyzes the input date to identify or classify various features extractable from the data, such as position data, shape data, location data, presence data, and so forth. As in the case of digital signal processing component 1032, machine-learning component 1034 can include multiple machine-learning algorithms that can be selected or deselected for an analysis. Among other things, machine-learning component 1034 can use the key information generated by digital signal processing component 1032 to detect relationships and/or correlations between the generated key information and previously learned gestures to probabilistically decide which gesture is being performed. At times, an application, such as applications 1014, can configure the operating behavior of machine-learning component 1034 via gesture Sensor APIs 1016.

CONCLUSION

Various embodiments utilize application-based processing parameters to dynamically configure a radar-based detection system based upon an operating context of an associated device. A first application with execution priority on a device dynamically configures the radar-based detection system to emit a radar field suitable for a first operating context associated with the first application. The first application can also dynamically configure processing parameters of the radar-based detection system, such as digital signal processing parameters and machine-learning parameters. In some cases, a second application on the device assumes execution priority over the first application. When the second application assumes execution priority, it can dynamically reconfigure the radar-based detection system to emit a radar field suitable to a second operating context associated with the second application. Alternately or additionally, the second application can dynamically reconfigure the processing parameters of the radar-based detection system based upon the second operating context of the second application.

Although the embodiments have been described in language specific to structural features and/or methodological acts, it is to be understood that the various embodiments defined in the appended claims are not necessarily limited to the specific features or acts described. Rather, the specific features and acts are disclosed as example forms of implementing the various embodiments.

What is claimed is:
1. A device comprising:
a processing system;
a radar-based detection component implemented at least partially in hardware, the radar-based detection component comprising:
  a radar-emitting element for transmitting a radar field;
  an antenna for receiving an incoming radio frequency (RF) signal generated by the radar field reflecting off target objects; and
  a pipeline for processing the incoming RF signal to identify information about the target objects;
multiple applications maintained in computer-readable storage media and executable by the processing system to perform a plurality of operations; and
multiple gesture sensor Application Programming Interfaces (APIs) maintained in the computer-readable storage media and configured to provide a programmatic interface between the applications and the radar-based detection component, the gesture sensor APIs configured to grant the applications mid-level or high-level access to the radar-based detection component to enable the applications to:
  configure at least one of a digital signal processing stage of the pipeline of the radar-based detection component, a machine-learning stage of the pipeline of the radar-based detection component, or the radar field of the radar-based detection component via the mid-level or high-level access to the radar-based detection component granted by the gesture sensor APIs based on a first operating context associated with a first application of the applications;
  acquire, by the first application and via the gesture sensor APIs, first information from the radar-based detection component, the first information associated with a first target object; and
  reconfigure at least one of the digital signal processing stage of the pipeline of the radar-based detection component, the machine-learning stage of the pipeline of the radar-based detection component, or the radar field of the radar-based detection component via the mid-level or high-level access to the radar-based detection component granted by the gesture sensor APIs based on a second operating context associated with a second application of the applications, the reconfiguring enabling the device to acquire second information associated with a second target object from the radar-based detection component.
2. The device as recited in claim 1, wherein:
the first operating context comprises a detection of a user entering a room; and
the second operating context comprises a detection of an identity of the user.

3. The device as recited in claim 1, wherein the configuring or the reconfiguring comprises setting:
a ramp slope parameter;
a frame rate parameter;
a Doppler coherent processing interval parameter;
a pre-Doppler coherent processing interval parameter; or
a transmission power parameter.

4. The device as recited in claim 1, wherein:
the gesture sensor APIs further enable the device to receive feedback from the radar-based detection component; and
the reconfiguring is further based upon the feedback.

5. The device as recited in claim 1, wherein the configuring or the reconfiguring comprises multiple iterations based on the first or second context, respectively.

6. The device as recited in claim 1, wherein the configuring or the reconfiguring comprises configuring the radar-based detection component to a predetermined configuration associated with a preset configuration API.

7. A method for dynamically configuring a radar-based detection component performed by a device, the method comprising:
configuring, based on a first operating context of the device, at least one of a digital signal processing stage of a pipeline of the radar-based detection component, a machine-learning stage of the pipeline of the radar-based detection component, or a radar field of the radar-based detection component using at least one gesture sensor Application Programming Interface (API) that grants at least one application mid-level or high-level access to the radar-based detection component;
receiving first information from the radar-based detection component via the gesture sensor API;
determining to reconfigure the radar-based detection component based, at least in part, on the first information; and
reconfiguring at least one of the digital signal processing stage of the pipeline of the radar-based detection component, the machine-learning stage of the pipeline of the radar-based detection component, or the radar field of the radar-based detection component via the mid-level or high-level access to the radar-based detection component granted by the gesture sensor API based upon a second operating context associated with the device, the reconfiguring enabling the device to acquire second information from the radar-based detection component.

8. The method as recited in claim 7, wherein the reconfiguring comprises changing a velocity detection resolution of the radar-based detection component.

9. The method as recited in claim 7, wherein the configuring, the receiving, the determining, and the reconfiguring are performed in a context of a same application.

10. The method as recited in claim 9, wherein the same application comprises an operating system.

11. The method as recited in claim 7, wherein the configuring comprises applying a default configuration to the radar-based detection component.

12. The method as recited in claim 7:
wherein the reconfiguring is further based on feedback from the radar-based detection component; and
further comprising repeating the reconfiguring for a predetermined number of iterations.

13. A device comprising:
a processing system;
a radar-based detection component implemented at least partially in hardware, the radar-based detection component comprising:
a radar-emitting element for transmitting a radar field;
an antenna for receiving an incoming RF signal generated by the radar field reflecting off target objects; and
a pipeline for processing the incoming RF signal to identify information about the target objects;
an application maintained in computer-readable storage media and executable by the processing system to perform a plurality of operations; and
multiple gesture sensor Application Programming Interfaces (APIs) maintained in the computer-readable storage media and configured to provide a programmatic interface between the application and the radar-based detection component, the gesture sensor APIs configured to grant the application mid-level or high-level access to the radar-based detection component to enable the application to:
configure at least one of a digital signal processing stage of the pipeline of the radar-based detection component, a machine-learning stage of the pipeline of the radar-based detection component, or the radar field of the radar-based detection component, via the mid-level or high-level access to the radar-based detection component granted by the gesture sensor APIs, based on a first operating context associated with the application;
receive, from the radar-based detection component and via the gesture sensor APIs, first information associated with a first target object;
reconfigure at least one of the digital signal processing stage of the pipeline of the radar-based detection component, the machine-learning stage of the pipeline of the radar-based detection component, or the radar field of the radar-based detection component, via the mid-level or high-level access to the radar-based detection component granted by the gesture sensor APIs, based on a second operating context associated with the application; and
acquire, from the radar-based detection component and via the gesture sensor APIs, second information associated with a second target object.

14. The device as recited in claim 13, wherein the gesture sensor APIs comprise multiple preset APIs structured to configure the radar-based detection component to respective predetermined configurations.

15. The device as recited in claim 13, wherein the first or second information comprises a 3-dimensional (3D) spatial profile.

16. The device as recited in claim 13, wherein:
the gesture sensor APIs further enable the application to receive feedback from the radar-based detection component via at least one of the gesture sensor APIs; and
the reconfiguring is further based on the feedback.

17. The device as recited in claim 13, wherein the gesture sensor APIs further enable the application to repeat the reconfiguration for a predetermined number of iterations.

18. The device as recited in claim 1, wherein the mid-level or high-level access to the radar-based detection component enables the applications to perform the configuring or the reconfiguring without the applications selecting or setting specific parameters of the digital signal processing stage of the pipeline of the radar-based detection component, the machine-learning stage of the pipeline of the radar-based detection component, or the radar field of the radar-based detection component.

19. The method as recited in claim 7, wherein the mid-level or high-level access to the radar-based detection component enables the configuring or the reconfiguring without the application selecting or setting specific parameters of the digital signal processing stage of the pipeline of the radar-based detection component, the machine-learning stage of the pipeline of the radar-based detection component, or the radar field of the radar-based detection component.

20. The device as recited in claim 13, wherein the mid-level or high-level access to the radar-based detection component enables the application to perform the configuring or the reconfiguring without the application selecting or setting specific parameters of the digital signal processing stage of the pipeline of the radar-based detection component, the machine-learning stage of the pipeline of the radar-based detection component, or the radar field of the radar-based detection component.

* * * * *